US008660182B2

(12) United States Patent
Zhong et al.

(10) Patent No.: US 8,660,182 B2
(45) Date of Patent: Feb. 25, 2014

(54) MPEG MOTION ESTIMATION BASED ON DUAL START POINTS

(75) Inventors: Lefan Zhong, Santa Clara, CA (US); Ram Prabhakar, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 140 days.

(21) Appl. No.: 10/457,644

(22) Filed: Jun. 9, 2003

(65) Prior Publication Data

US 2004/0247029 A1    Dec. 9, 2004

(51) Int. Cl.
*H04N 7/12*    (2006.01)
*H04B 1/66*    (2006.01)

(52) U.S. Cl.
USPC .................. 375/240.16; 375/240.12

(58) Field of Classification Search
USPC ......... 348/155, 669, 390, 400, 401, 402, 409, 348/415–416, 700; 375/240, 240.1, 240.02, 375/240.12, 240.16, 240.24, 240.13, 375/240.01, 240.09; 382/232, 236, 238, 382/107, 106, 166, 234, 235, 244–253
See application file for complete search history.

(56) References Cited

U.S. PATENT DOCUMENTS

| | | |
|---|---|---|
| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |
| 4,755,810 A | 7/1988 | Knierim |
| 4,814,978 A | 3/1989 | Dennis |
| 4,992,857 A | 2/1991 | Williams |
| 5,045,940 A | 9/1991 | Peters et al. |
| 5,130,797 A | 7/1992 | Murakami et al. |
| 5,146,324 A | 9/1992 | Miller et al. |
| 5,212,742 A | 5/1993 | Normile et al. |
| 5,225,875 A | 7/1993 | Shapiro et al. |
| 5,233,689 A | 8/1993 | Rhoden et al. |
| 5,267,334 A | 11/1993 | Normille et al. |
| 5,267,344 A | 11/1993 | Nelson, III |
| 5,369,744 A | 11/1994 | Fukushima et al. |
| 5,371,896 A | 12/1994 | Gove et al. |
| 5,596,369 A | 1/1997 | Chau |
| 5,598,514 A | 1/1997 | Purcell et al. |
| 5,608,652 A | 3/1997 | Astle |

(Continued)

FOREIGN PATENT DOCUMENTS

| | | |
|---|---|---|
| CN | 1489391 | 4/2004 |
| EP | 1283640 | 2/2003 |

(Continued)

OTHER PUBLICATIONS

Tourapis et al., Proc. Of SPIE Conf. Vis. Comm. and Img. Procssng, vol. 3, , pp. 1365-1373, Jun. '00.

(Continued)

*Primary Examiner* — Behrooz Senfi

(57) ABSTRACT

A more efficient motion estimation process that utilizes a plurality of predicted start points (e.g., two predicted start points) based on blocks adjacent to the current block together with other improvements and requires minimal system resources (e.g., hardware resources and CPU processing) in its hardware implementation is provided. More particularly, the motion estimation technique in accordance with the present invention performs a plurality of coarse searches (either sequentially or in parallel) using a plurality of predicted start positions followed by a fine search.

29 Claims, 13 Drawing Sheets

(56) References Cited

U.S. PATENT DOCUMENTS

| | | |
|---|---|---|
| 5,613,146 A | 3/1997 | Gove et al. |
| 5,623,311 A | 4/1997 | Phillips et al. |
| 5,630,033 A | 5/1997 | Purcell et al. |
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |
| 5,883,823 A | 3/1999 | Ding |
| 5,889,949 A | 3/1999 | Charles |
| 5,898,881 A | 4/1999 | Miura et al. |
| 5,909,224 A | 6/1999 | Fung |
| 5,923,375 A | 7/1999 | Pau |
| 5,954,786 A | 9/1999 | Volkonsky |
| 5,969,728 A | 10/1999 | Dye et al. |
| 5,999,220 A | 12/1999 | Washino |
| 6,035,349 A | 3/2000 | Ha et al. |
| 6,073,185 A | 6/2000 | Meeker |
| 6,088,355 A | 7/2000 | Mills et al. |
| 6,098,174 A | 8/2000 | Baron et al. |
| 6,104,470 A | 8/2000 | Streefkerk et al. |
| 6,144,362 A | 11/2000 | Kawai |
| 6,148,109 A | 11/2000 | Boon et al. |
| 6,157,751 A | 12/2000 | Olson et al. |
| 6,175,594 B1 | 1/2001 | Strasser et al. |
| 6,188,799 B1 | 2/2001 | Tan et al. |
| 6,195,389 B1 | 2/2001 | Rodriguez et al. |
| 6,222,883 B1* | 4/2001 | Murdock et al. ......... 375/240.16 |
| 6,269,174 B1 | 7/2001 | Koba et al. |
| 6,272,281 B1 | 8/2001 | De Vos et al. |
| 6,305,021 B1 | 10/2001 | Kim |
| 6,311,204 B1 | 10/2001 | Mills |
| 6,317,124 B2 | 11/2001 | Reynolds |
| 6,356,945 B1 | 3/2002 | Shaw et al. |
| 6,360,234 B2 | 3/2002 | Jain et al. |
| 6,418,166 B1* | 7/2002 | Wu et al. ................ 375/240.12 |
| 6,459,738 B1 | 10/2002 | Wu et al. |
| 6,539,060 B1 | 3/2003 | Lee et al. |
| 6,539,120 B1 | 3/2003 | Sita et al. |
| 6,560,629 B1 | 5/2003 | Harris |
| 6,647,062 B2 | 11/2003 | Mackinnon |
| 6,665,346 B1 | 12/2003 | Lee et al. |
| 6,687,788 B2 | 2/2004 | Vorbach et al. |
| 6,690,835 B1 | 2/2004 | Brockmeyer et al. |
| 6,690,836 B2 | 2/2004 | Natarajan et al. |
| 6,721,830 B2 | 4/2004 | Vorbach et al. |
| 6,751,721 B1 | 6/2004 | Webb, Jr. et al. |
| 6,760,478 B1 | 7/2004 | Adiletta et al. |
| 6,782,052 B2 | 8/2004 | Sun et al. |
| 6,799,192 B1 | 9/2004 | Handley |
| 6,807,317 B2 | 10/2004 | Mathew et al. |
| 6,823,443 B2 | 11/2004 | Horiyama et al. |
| 6,950,473 B2 | 9/2005 | Kim et al. |
| 6,996,645 B1 | 2/2006 | Wiedenman et al. |
| 7,038,687 B2 | 5/2006 | Booth, Jr. et al. |
| 7,173,631 B2 | 2/2007 | Anderson |
| 7,260,148 B2* | 8/2007 | Sohm ....................... 375/240.16 |
| 7,277,101 B2 | 10/2007 | Zeng |
| 7,289,672 B2 | 10/2007 | Sun et al. |
| 7,379,501 B2 | 5/2008 | Lainema |
| 7,403,564 B2 | 7/2008 | Laksono |
| 7,450,640 B2 | 11/2008 | Kim et al. |
| 7,499,491 B2 | 3/2009 | Lee et al. |
| 7,548,586 B1 | 6/2009 | Mimar |
| 7,548,596 B2 | 6/2009 | Yen et al. |
| 7,551,671 B2* | 6/2009 | Tyldesley et al. ............ 375/240 |
| 7,565,077 B2 | 7/2009 | Rai et al. |
| 7,581,182 B1 | 8/2009 | Herz |
| 7,630,097 B2 | 12/2009 | Kodama et al. |
| 7,689,000 B2 | 3/2010 | Kazama |
| 7,693,219 B2 | 4/2010 | Yan |
| 7,720,311 B1 | 5/2010 | Sriram |
| 7,721,069 B2 | 5/2010 | Ramchandran et al. |
| 7,792,194 B2 | 9/2010 | Zhong et al. |
| 7,924,923 B2 | 4/2011 | Lee et al. |
| 8,009,923 B2 | 8/2011 | Li et al. |
| 8,369,402 B2 | 2/2013 | Kobayashi et al. |
| 2001/0020941 A1 | 9/2001 | Reynolds |
| 2001/0024448 A1 | 9/2001 | Takase et al. |
| 2001/0028353 A1 | 10/2001 | Cheng |
| 2001/0028354 A1 | 10/2001 | Cheng et al. |
| 2002/0015445 A1 | 2/2002 | Hashimoto |
| 2002/0015513 A1* | 2/2002 | Ando et al. .................... 382/107 |
| 2002/0025001 A1* | 2/2002 | Ismaeil et al. ............ 375/240.16 |
| 2002/0041626 A1 | 4/2002 | Yoshioka et al. |
| 2002/0109790 A1 | 8/2002 | Mackinnon |
| 2002/0114394 A1* | 8/2002 | Ma ........................... 375/240.16 |
| 2002/0118743 A1 | 8/2002 | Jiang |
| 2003/0020835 A1 | 1/2003 | Petrescu |
| 2003/0048361 A1 | 3/2003 | Safai |
| 2003/0078952 A1 | 4/2003 | Kim et al. |
| 2003/0141434 A1 | 7/2003 | Ishikawa et al. |
| 2003/0161400 A1* | 8/2003 | Dinerstein et al. ........ 375/240.16 |
| 2004/0057523 A1 | 3/2004 | Koto et al. |
| 2004/0095998 A1* | 5/2004 | Luo et al. ................. 375/240.16 |
| 2004/0100466 A1 | 5/2004 | Deering |
| 2004/0150841 A1 | 8/2004 | Lieberman et al. |
| 2004/0156435 A1* | 8/2004 | Itoh et al. ................. 375/240.16 |
| 2004/0174998 A1 | 9/2004 | Youatt et al. |
| 2004/0181564 A1 | 9/2004 | MacInnis et al. |
| 2004/0181800 A1 | 9/2004 | Rakib et al. |
| 2004/0190613 A1* | 9/2004 | Zhu et al. ................. 375/240.12 |
| 2004/0190617 A1 | 9/2004 | Shen et al. |
| 2004/0202245 A1 | 10/2004 | Murakami et al. |
| 2004/0213348 A1 | 10/2004 | Kim et al. |
| 2004/0218626 A1* | 11/2004 | Tyldesley et al. ............. 370/464 |
| 2004/0218675 A1 | 11/2004 | Kim et al. |
| 2004/0228415 A1 | 11/2004 | Wang |
| 2004/0257434 A1 | 12/2004 | Davis et al. |
| 2005/0008254 A1 | 1/2005 | Ouchi et al. |
| 2005/0033788 A1 | 2/2005 | Handley |
| 2005/0047502 A1 | 3/2005 | McGowan |
| 2005/0066205 A1 | 3/2005 | Holmer |
| 2005/0079914 A1 | 4/2005 | Kaido et al. |
| 2005/0105618 A1* | 5/2005 | Booth et al. .............. 375/240.16 |
| 2005/0123040 A1 | 6/2005 | Bjontegard |
| 2005/0190976 A1 | 9/2005 | Todoroki et al. |
| 2005/0238102 A1 | 10/2005 | Lee et al. |
| 2005/0238103 A1* | 10/2005 | Subramaniyan et al. 375/240.16 |
| 2005/0265447 A1 | 12/2005 | Park |
| 2005/0265454 A1 | 12/2005 | Muthukrishnan et al. |
| 2005/0276493 A1 | 12/2005 | Xin et al. |
| 2005/0281337 A1 | 12/2005 | Kobayashi et al. |
| 2005/0286630 A1 | 12/2005 | Tong et al. |
| 2006/0002466 A1 | 1/2006 | Park |
| 2006/0017802 A1 | 1/2006 | Yoo et al. |
| 2006/0056513 A1 | 3/2006 | Shen et al. |
| 2006/0056708 A1 | 3/2006 | Shen et al. |
| 2006/0109910 A1 | 5/2006 | Nagarajan |
| 2006/0115001 A1 | 6/2006 | Wang et al. |
| 2006/0133501 A1 | 6/2006 | Lee et al. |
| 2006/0133506 A1 | 6/2006 | Dang |
| 2006/0176299 A1 | 8/2006 | Subbalakshmi et al. |
| 2006/0176962 A1 | 8/2006 | Arimura et al. |
| 2006/0203916 A1 | 9/2006 | Chandramouly et al. |
| 2007/0002945 A1 | 1/2007 | Kim |
| 2007/0002950 A1 | 1/2007 | Yang |
| 2007/0036215 A1 | 2/2007 | Pan et al. |
| 2007/0070080 A1 | 3/2007 | Graham et al. |
| 2007/0133689 A1 | 6/2007 | Park et al. |
| 2007/0171981 A1 | 7/2007 | Qi |
| 2007/0217506 A1 | 9/2007 | Yang et al. |
| 2007/0230564 A1 | 10/2007 | Chen et al. |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |
| 2008/0117214 A1 | 5/2008 | Perani et al. |
| 2008/0137726 A1 | 6/2008 | Chatterjee et al. |
| 2008/0151997 A1 | 6/2008 | Oguz |
| 2008/0285444 A1 | 11/2008 | Diab et al. |

(56) References Cited

U.S. PATENT DOCUMENTS

| | | |
|---|---|---|
| 2009/0060277 A1 | 3/2009 | Zhang et al. |
| 2009/0086827 A1 | 4/2009 | Wu et al. |
| 2009/0116549 A1 | 5/2009 | Shen et al. |
| 2009/0122864 A1 | 5/2009 | Palfner et al. |
| 2009/0161763 A1 | 6/2009 | Rossignol et al. |
| 2009/0196350 A1 | 8/2009 | Xiong |
| 2009/0268974 A1 | 10/2009 | Takagi |
| 2010/0034268 A1 | 2/2010 | Kusakabe et al. |

FOREIGN PATENT DOCUMENTS

| | | |
|---|---|---|
| EP | 1283640 A2 | 12/2003 |
| GB | 2348559 | 4/2000 |
| GB | 2348559 | 11/2000 |
| JP | 04162893 | 6/1992 |
| JP | 11096138 | 4/1999 |
| JP | 2001184323 | 7/2001 |
| JP | 2005354686 | 12/2005 |
| JP | 2006287315 | 10/2006 |
| WO | 9827742 | 6/1998 |
| WO | 0233650 | 4/2002 |
| WO | 2005/001625 | 1/2005 |
| WO | 2005001625 | 1/2005 |
| WO | 2005096168 | 10/2005 |
| WO | 2006085137 | 8/2006 |

OTHER PUBLICATIONS

Zheng et al., Inter. Conf. Info. Systms, Analysis and Synthesis, SCI 2001/ISAS 2001, vol. 13, 2001.
Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.
Tourapis et al., Proc. of SPIE Conf. Vis. Comm. And Img. Processing, vol. 3, pp. 1365-1373, Jun. '00.
Zheng, et al., Inter. Conf. Info. Systems, Analysis and Synthesis, SCI 2001-ISAS 2001, vol. 13, 2001.
Realization of Low-Bit_Ratio Video Encoder Using Mpact Media Processor; IWASAKI, Junichi et al.; 1997.
Rohini Krishnan, et al., "Design of a 2D DCT/IDCT Application Specific VLIW Processor Supporting Scaled and Sub-sampled Blocks," 16th International Conference on VLSI Design, 2003, six pages.
Shite-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.
Tu, C., Liang, J., and Tran, T. "Adaptive Runlength Coding", in_IEEE Signal Processing Letters_vol. 10, No. 3, pp. 61-6. Mar. 2003.
Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, 23-26 May 2004.
"Ralf Schafer et al.,", "H.264/AVC", Dated: Jan. 2003, pp. 1-12.
_The Merriam-Webster Dictionary_. 2005 ed. Springfield, MA: Merriam-Webster Inc., 2005.
3D Graphics Processor for Mobile Set Based on Configurable Processor; TAKEMOTO, Takashi et al.
A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.
Advanced Video Coding for generic audiovisual services, Telecommunication Standardization Sector of ITU, Dated Mar. 2005, pp. 1-343.
Andrew Gibson, "H.264 Video Encoding Standard", year Aug. 2002, pp. 1-98, Queens University Kingston Ontario Canada.
Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.
Hannuksela, Miska et al., "Random Access Using Isolated Regions", IEEE 2003, pp. III-841 to III to 844.
Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.
Jamil-Ur-Rehman and Dr. Zhang Ye, "Efficient Techniques for Signaling Intra Prediction modes of H.264/Mpeg-4 Part 10", Proceedings of the First International Conference on Innovative Computing, Information and Control, ICICIC, Year 2006, pp. 1-4.
Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov 1997.
Kadono Shinya, et. Al. Revised edition H. 264/AVC Textbook, Impress R&D, Jan. 1, 2006, pp. 131-133.

\* cited by examiner

MPEG MOTION ESTIMATION BASED ON DUAL START POINTS

FIELD OF THE INVENTION

The invention generally relates to computer systems, and more particularly relates to MPEG motion estimation.

BACKGROUND OF THE INVENTION

Moving Pictures Experts Groups (MPEG) is an International Standards Organization (ISO) standard for compressing video data. Video compression is important in making video data files, such as full-length movies, more manageable for storage (e.g., in optical storage media), processing, and transmission. In general, MPEG compression is achieved by eliminating redundant and irrelevant information. Because video images typically consist of smooth regions of color across the screen, video information generally varies little in space and time. As such, a significant part of the video information in an image is predictable and therefore redundant. Hence, a first objective in MPEG compression is to remove the redundant information and leaving only the true or unpredictable information. On the other hand, irrelevant video image information is information that cannot be seen by the human eye under certain reasonable viewing conditions. For example, the human eye is less perceptive to noise at high spatial frequencies than noise at low spatial frequencies and less perceptive to loss of details immediately before and after a scene change. Accordingly, the second objective in MPEG compression is to remove irrelevant information. The combination of redundant information removal and irrelevant information removal allows for highly compressed video data files.

MPEG compression incorporates various well-known techniques to achieve the above objectives including: motion-compensated prediction/estimation, Discrete Cosine Transform (DCT), quantization, and Variable-Length Coding (VLC). In general, prediction/estimation is a process in which past information is used to predict/estimate current information. There is typically a difference/error between the past information used and the actual/current information. As part of the compression scheme, this difference (instead of the actual/current video information) is transmitted for use in reconstructing/decoding a compressed video frame by essentially adding it to existing past information that may be referred to as a reference frame. How well the decompression process performs depends largely on the estimate of this difference. When successive video frames involve moving objects, the estimate must also include motion compensation. This is done through the use of motion vectors which are the displacement measurements of objects between successive video frames. These motion vectors are then additionally transmitted as part of the compression scheme to be used in reconstructing/decoding the compressed video frame.

One of the motion-compensated estimation techniques that is most suitable for hardware implementation due to its consistency and simplicity is block matching. In block matching, motion is estimated on the basis of blocks and a motion vector is generated for each block under the assumption that all the pixels within a block have the same motion activity. In short, a block from a search area in the reference video frame (i.e., a frame that has been received and/or processed previously) is identified through a search based on a match selection criteria relative to a block from a present frame. Such selection criteria is typically designed to ensure a minimized estimation difference. The most effective search but also the most processing and computing intensive is a full exhaustive search in which every block within the search area is examined and corresponding computation made. If a search area is limited to ±16 pixels displacement in the X and Y directions, then the total number of matches need to be made is approximately $(2*(16)+1)^2=1089$. The match selection criterion used for the full search may be the Sum of Absolute Difference (SAD) (other match selection criteria include mean absolute difference, mean square difference, etc.). The SAD for a block A of size N×N inside the current frame compared to a block B of a distance ($\Delta x, \Delta y$) from A in the previous (or reference) frame is defined as:

$$SAD(\Delta x, \Delta y) = \sum_{x,y=1}^{N} |I_A(x, y) - I_B(x + \Delta x, y + \Delta y)|$$

where I is the intensity level of a pixel.

As shown in the SAD equation above, an addition and a subtraction operation are required for each pixel match. Hence, an approximate total of 2178 operations are required for each pixel match in a full search. Consequently, each macroblock (16×16 pixels) requires approximately 2178× 256 or 557K operations which is processor intensive and therefore undesirable. The corresponding blocks from the current frame and the reference frame with the smallest SAD value are then selected as the best matched (i.e., having the least difference/error) for transmission as compression information. The associated motion (displacement) vector is computed from the selected pair of blocks for use as motion compensation information.

To reduce the processing needed while minimizing estimation difference/error, other search techniques have been developed. One such search techniques is the Diamond Search (DS). In a DS, which is based on the assumption that motion vectors are in general center biased, a search area (in a block in the reference frame) includes nine checking points as shown for example in FIG. 1A. The search begins with an examination of the center checking point of the search area. This portion of the search (e.g., involving nine checking points) is known as a Large Diamond Search (LDS). If the minimum SAD is found at the center, then four additional checking points representing a smaller diamond, as shown in FIG. 1B, are examined and the search stops. The portion of the search (e.g., involving 4 additional checking points) is known as a Small Diamond Search (SDS). Otherwise, depending on the position of the current minimum, additional checking points will have to be examined as shown for example in FIGS. 1C and 1D. By considering the present minimum as the new center of a new large diamond created, the process continues until the minimum which is a center point is found. At which point, a smaller diamond with four additional checking points are examined. A discussion of the DS is presented for example in "A New Predictive Diamond Search Algorithm for Block Based Motion Estimation" by A. Tourapis, G. Shen, M. Liou, O. Au, and I. Ahmad, Proc. Of SPIE Conf. On Visual Communication and Image Processing, Vol. 3, pp. 1365-1373, 20-23 Jun. 2000. This material is incorporated herein by reference in its entirety.

While DS typically requires only a fraction of the processing required in a full search, a DS is susceptible to getting caught up with local minimums which are not desirable because they may not represent the best matched macroblock. In other words, while the DS search relies on the inherent center-biased nature of motion vectors and allows for iteration searches to examine additional checkpoints, it has no mechanism to ensure that the minimum SAD can be quickly determined.

Moreover, the paper "A New Predictive Diamond Search Algorithm for Block Based Motion Estimation" cited above takes advantage of the high correlation of neighboring macroblocks (and therefore their associated motion vectors) and use as the starting point of the DS the median value of the motion vectors of three neighboring blocks: left macroblock LMB relative to the current macroblock that is designated the center of the search area, up macroblock UMB relative to the current macroblock that is designated the center of the search area, and up-right macroblock URMB relative to the current macroblock that is designated the center of the search area. In other words, instead of using the center pixel of the diamond as a starting point, the median of these three neighboring blocks is used. By taking into consideration the correlation between adjacent macroblocks (and their associated motion vectors), an improved prediction can be made thereby shortening the search.

Furthermore, in MPEG-4, in addition to a stage involving the aforementioned DS which is an integer pixel motion estimation, a half-pixel motion estimation stage may be implemented. As its name suggests, a half-pixel motion estimation involves a search of checking points that are at a half-distance between two checking points of the integer pixel motion estimation search. The half-distance can easily be interpolated from the checking points of the integer pixel motion estimation search. The half-pixel motion estimation stage is designed to improve the accuracy of motion vectors. See "A New Predictive Diamond Search Algorithm for Block Based Motion Estimation" by W. Zheng, I. Ahmad, and M. Liou, International Conf. on Information Systems, Analysis and Synthesis, SCI 2001/ISAS 2001 Vol. 13, 2001. It is desirable to reduce even further the processing required for motion-compensated estimation which translates to less power and smaller die size required.

Thus, a need exists for a more efficient, less complex, and effective motion-compensated estimation technique that can be easily implemented in hardware.

SUMMARY OF THE INVENTION

Accordingly, the present invention provides a more efficient, less complex, and effective motion-compensated estimation technique that can be easily implemented in hardware.

The present invention meets the above need with a motion estimation technique that involves selecting a plurality of predicted start motion vectors, performing coarse searches using the plurality of predicted start motion vectors (either sequentially or in parallel), determining a Sum of Absolute Difference (SAD) value and the associated vector from the coarse searches, and performing a fine search using the vector determined from the coarse searches as a starting position. In the preferred embodiment, the plurality of predicted start motion vectors are two (2) start motion vectors related to the macroblock that is immediately above the current macroblock (a.k.a. the UP macroblock) and the macroblock that is immediately on the left of the current macroblock (a.k.a. the LEFT macroblock). In accordance with the present invention, the correlation between adjacent macroblocks (and their associated motion vectors) is utilized by using two predicted starting points based on adjacent macroblocks. This results in an improved prediction (especially for fast motion videos) which in turn shortening the search.

In the preferred embodiment, the coarse searches are 16×16 Diamond Searches (DS) and the fine search involves an 8×8 search and a half-pixel search. More particularly, the DS's are based on a 5-Steps Diamond Search (5SDS). 5SDS involves five checking points. As a result of the use of a plurality of predicted starting points as well as other improvements, the processing required for carrying out the whole search is significantly reduced thereby rendering an efficient motion estimation technique that requires minimal system resources (e.g., hardware resources and CPU processing).

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention is related to MPEG compressed video image data, it is to be appreciated that the present invention is also applicable to other video compression schemes.

The motion estimation technique in accordance with the present invention utilizes a plurality of predicted start points (e.g., two predicted start points) based on blocks adjacent to the current block together with other improvements to provide a more efficient motion estimation process that requires minimal system resources (e.g., hardware resources and CPU processing) in its hardware implementation. More particularly, the motion estimation technique in accordance with the present invention performs a plurality of coarse searches (either sequentially or in parallel) using a plurality of start motion vectors followed by a fine search.

Figure 1B:
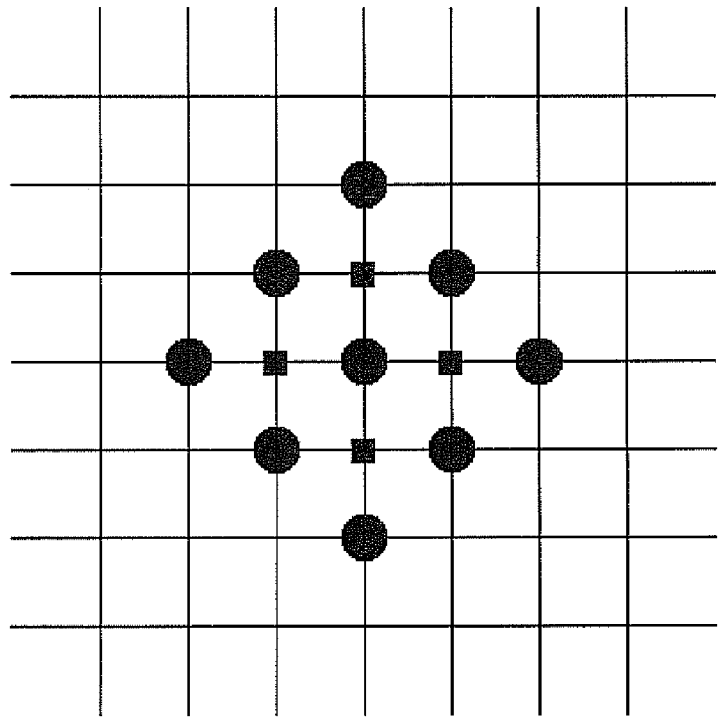
FIGS. 1A-1D illustrate how a prior-art Diamond Search (DS) is carried out.
Figure 1A:
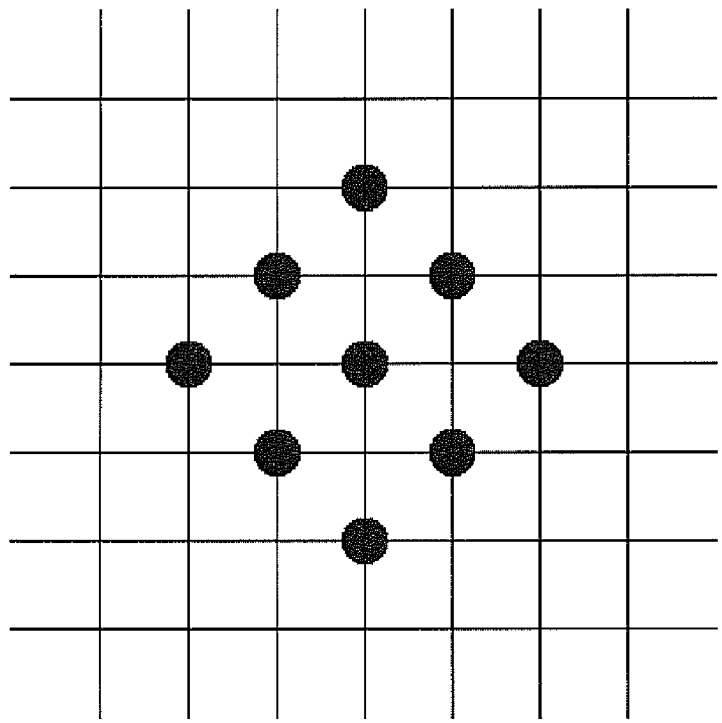
Figure 1D:
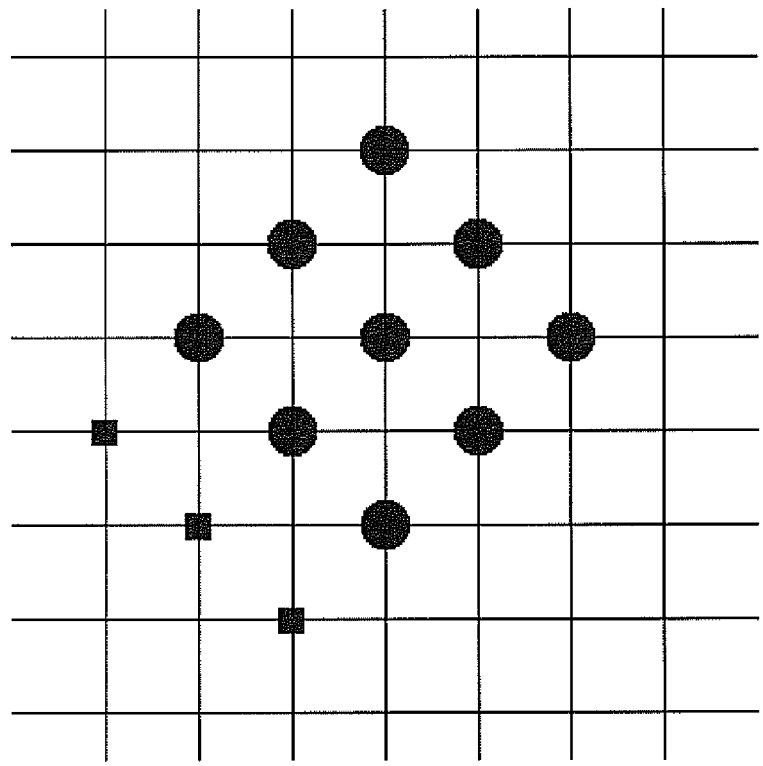
Figure 1C:
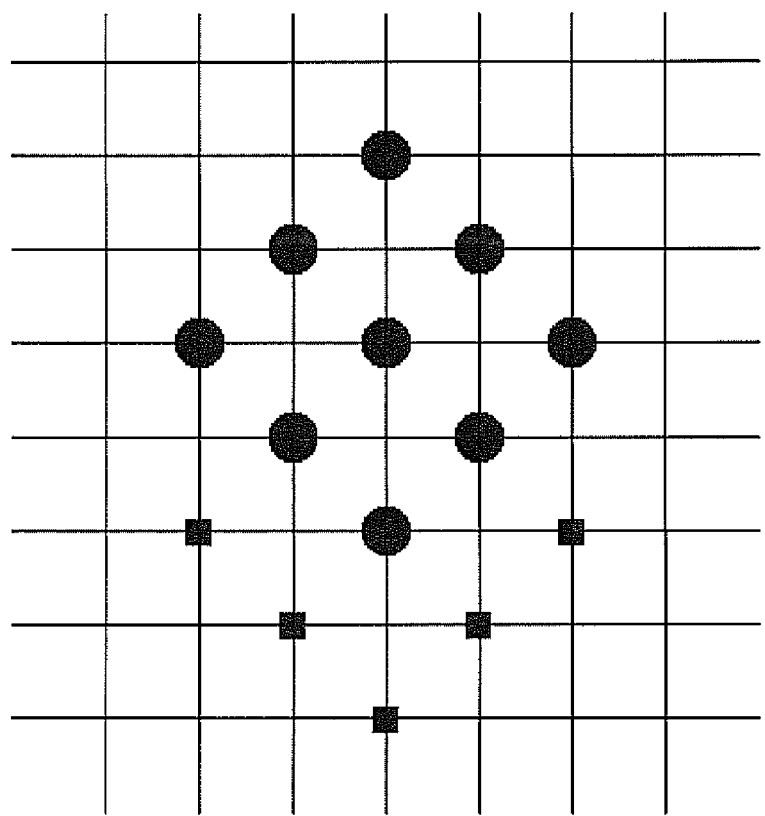
Figure 2:
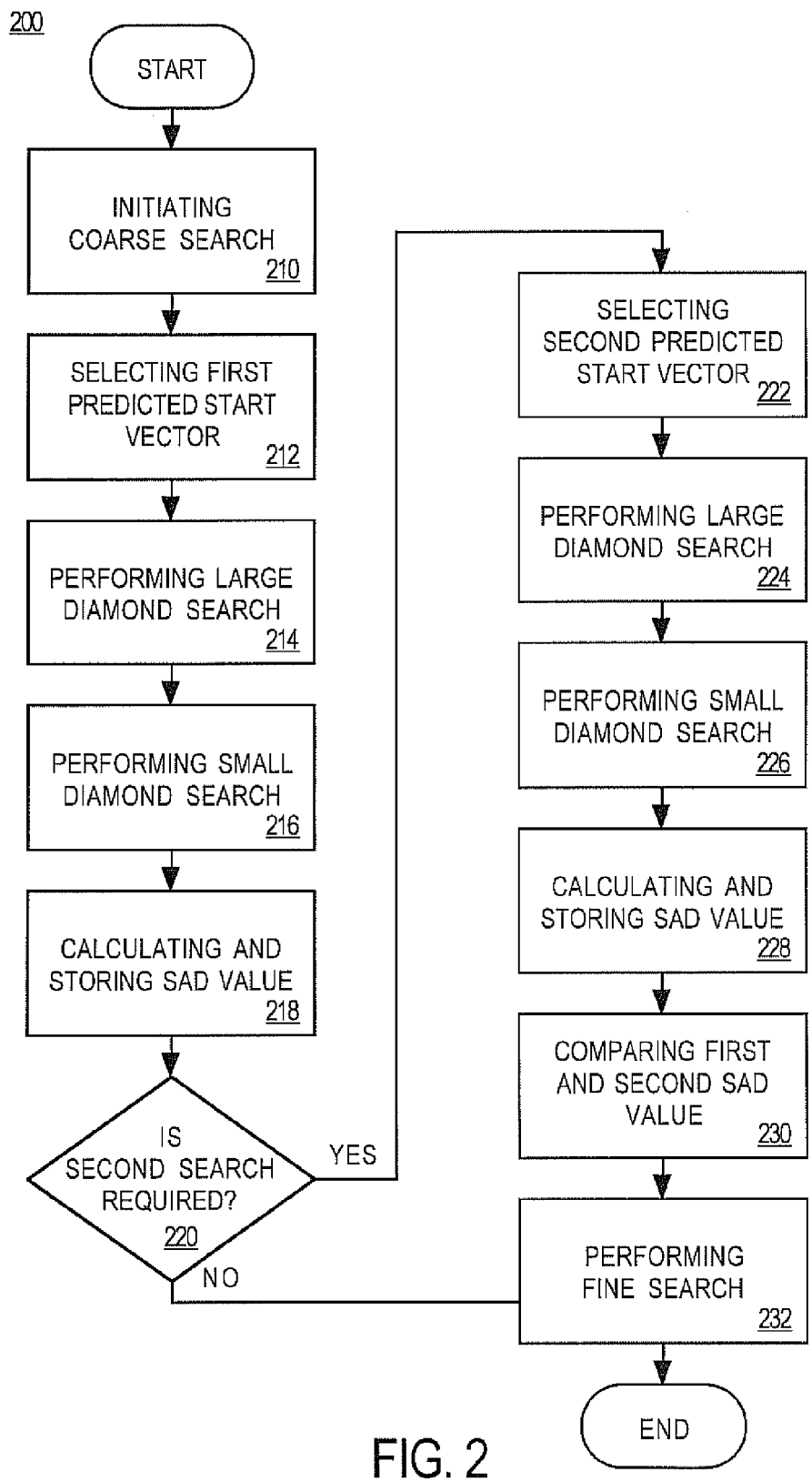
FIG. 2 is a high level flow chart of the steps carried out in the sequential searches embodiment of the present invention.
Figure 4:
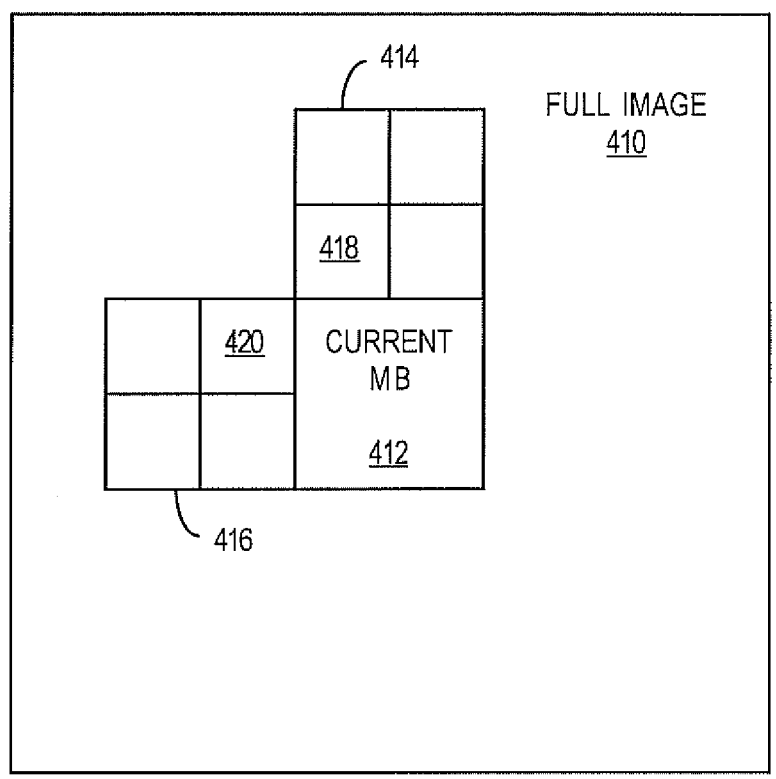
FIG. 4 illustrates the relative positions of a current macroblock, an UP macroblock, and a LEFT macroblock in a video frame in accordance with the present invention.

Referring now to FIG. 2 illustrating a high level flow chart of the steps carried out in the sequential searches embodiment of the present invention. In step 210, a coarse motion estimation search is initiated. In the preferred embodiment, a coarse search involves diamond searches that involve five checking points. Other types of diamond searches may be implemented as well. Next, in step 212, a first predicted start motion vector associated with a macroblock is selected as the starting position of the coarse search. Depending on the encoded mode associated with the current video macroblock as shown as current macroblock 412 of FIG. 4, either predict start motion vector V0 is set to (0,0) or to the motion vector of 8×8 block 418 whose position relative to the current macroblock in the current frame is illustrated in FIG. 4. In particular, as shown in FIG. 4, 8×8 block 418 is the lower left 8×8 block of UP macroblock 414 adjacent to current macroblock 412. The encoded mode indicates whether the current macroblock is an Inter macroblock that is predicted from past information such as a previous video frame or an Intra macroblock that is not based on any past information (i.e., no motion estimation is needed).

In scenario 1, if the encoded mode of current macroblock 412 is set as Intra (a.k.a. I-encoded), typically a whole frame is Intra, no estimation search is performed. In scenario 2, if the encoded mode of current macroblock 412 is set as Inter (a.k.a. P-encoded) and UP macroblock 414 is Inter then starting point V0 is set to the motion vector of UP 8×8 block 418. In scenario 3, if the encoded mode of current macroblock 412 is set as Inter (a.k.a. P-encoded) and UP macroblock 414 is Intra then starting point V0 is set to (0,0). In scenario 4, if the encoded mode of current macroblock 412 is set as Inter (a.k.a. P-encoded) and UP macroblock 414 is out of video range, the current macroblock is considered an I-encoded macroblock and the starting point is set to (0,0).

Alternatively, for scenario 2, the start motion vector V0 can also be set to the motion vector of any of the remaining 8×8 blocks of UP macroblock 414 or to the motion vector of UP macroblock 414 itself. Or, the starting point V0 can be set to the motion vector of an 8×8 block in LEFT macroblock 416 or the motion vector of LEFT macroblock 416 itself whose position relative to current macroblock 412 in current frame 400 is illustrated in FIG. 4 as long as such motion vector is different from the one selected as the second predicted start motion vector (see step 222). Or the starting point V0 can be set to the motion vector of an 8×8 block in another macroblock in the proximity of current macroblock 412 as long as such motion vector is different from the one selected as the second predicted start motion vector (see step 222). The motion vector of 8×8 block 418 or UP macroblock 414 is determined using an 8×8 search algorithm (described, for example, in greater detail in step 232 below) or a 5SDS (described, for example, in greater detail in step 216 below), respectively.

Figure 4A:
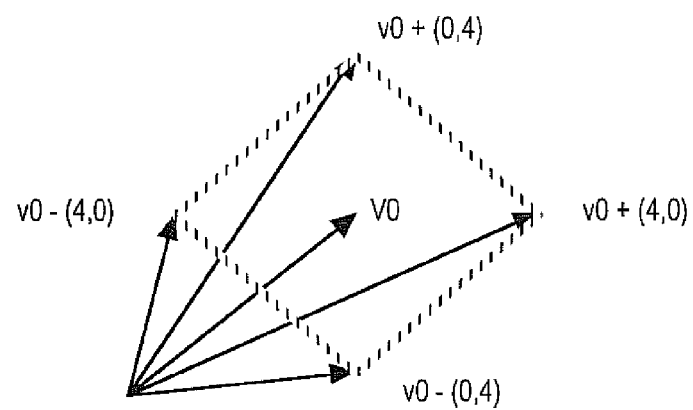
FIG. 4A illustrates large diamond search of steps 214 and 224 in accordance with the present invention.

Using the first predicted start motion vector selected in step 212, a large diamond search is performed (step 214). A description of this large diamond search is provided below. The large diamond search involves searching the checking points (V0.x,V0.y), (V0.x,V0.y+4), (V0.x,V0.y−4), (V0.x+4, V0.y), and (V0.x−4,V0.y) located in the current video frame which correspond to motion vectors V0, V0+(0,4), V0−(0,4), V0+(4,0), and V0−(4,0). The first predicted start motion vector is the center of the five checking points. As indicated, the step offset is 4 pixels. In this large diamond search, which is illustrated in FIG. 4A, the Sum of Absolute Difference (SAD) of the five checking points inside the current frame is computed relative to the pixels inside a selected macroblock inside the reference/previous frame is defined as:

$$SAD(v) = \sum_{j,k=1}^{N} |I_V(j, k) - I_{CP}(j + v \cdot x, k + v \cdot y)| \tag{1}$$

where $I_V$ is the intensity level of the pixels inside the macroblock inside the previous frame, $I_{CP}$ is the intensity level of the pixel at a checking point inside the current frame, and N is 16 (the number of rows and the number of columns in macroblock).

Essentially, the SAD value indicates how well a particular block in the current frame matches a block at a position in the previous frame. The smaller the SAD value the better match it is. SAD calculation is center-biased. If the vector associated with a pixel position for which a SAD value is computed is a center point (0,0), the SAD(v) value is subtracted by a predetermined factor FAVOR_0 preferably set at 129 to favor the selection of this vector as the one having the minimum SAD. In so doing, SAD calculation is ensured to be center biased. Additionally, if the range of the X or Y component of a motion vector exceeds [−15, 15], then the SAD associated with this vector is maintained at the maximum allowable SAD value of 255×256. In other words, when the X or Y component of a motion vector exceeds the allowable range, the motion vector is excluded by assigning a large SAD value to it.

From the SADs calculated for each checking point relative to the pixels within the macroblock inside the reference frame, the pixel position (hereinafter referred to as vector) with the minimum SAD and the corresponding SAD value are selected and stored. Preferably, the search order for the checking points is V0−(4,0), V0, V0+(4,0), V0−(0,4), and V0+(0,4).

In terms of computation operations, for a large diamond search, the SAD value calculation for each vector inside the macroblock associated with the first predicted start motion vector requires 5 (checking points)×2 (one addition operation and one subtraction operation)=10 operations.

Next, using the vector selected and stored in step 214 as the starting position, a small diamond search based on a 5SDS algorithm is performed (step 216). The small diamond search involves searching the checking points (v.x,v.y), (v.x,v.y+1), (v.x,v.y−1), (v.x+1,v.y), and (v.x−1,v.y) located in the current video frame which correspond to motion vectors v (the motion vector stored in step 214), v+(0,1), v−(0,1), v+(1,0), and v−(1,0). As indicated, the step offset is 1 one pixel. The starting point is the center of the five checking points. The small diamond search of step 216 is similar to the large diamond search of step 214. Equation 1 from above is also used to calculate the SADs for the checking points relative to the pixels inside the macroblock inside the previous/reference frame. However, unlike the large diamond search in step 214 which finishes when the SADs for all checking points are computed and the relative minimum SAD among the five checking points is determined, the small diamond search in step 216 will finish if the pixel with the minimum SAD is the center of the diamond made up by the checking points or if the search iteration reaches four (4).

Figure 4C:
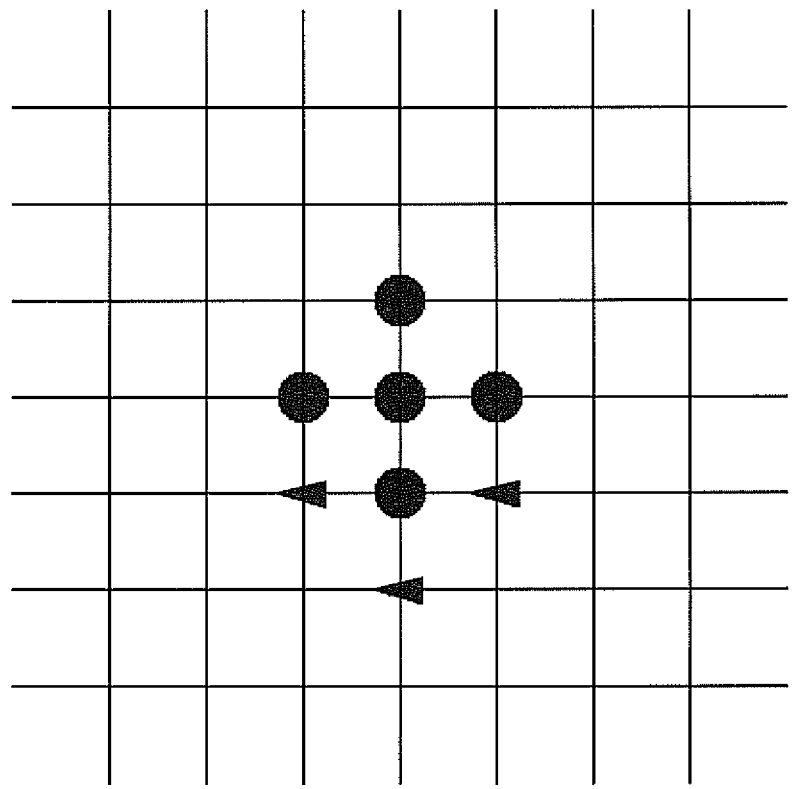
FIGS. 4B-4C illustrate, for example, the first two iterations/steps of the small diamond search of steps 216 and 226 in accordance with the present invention.
Figure 4B:
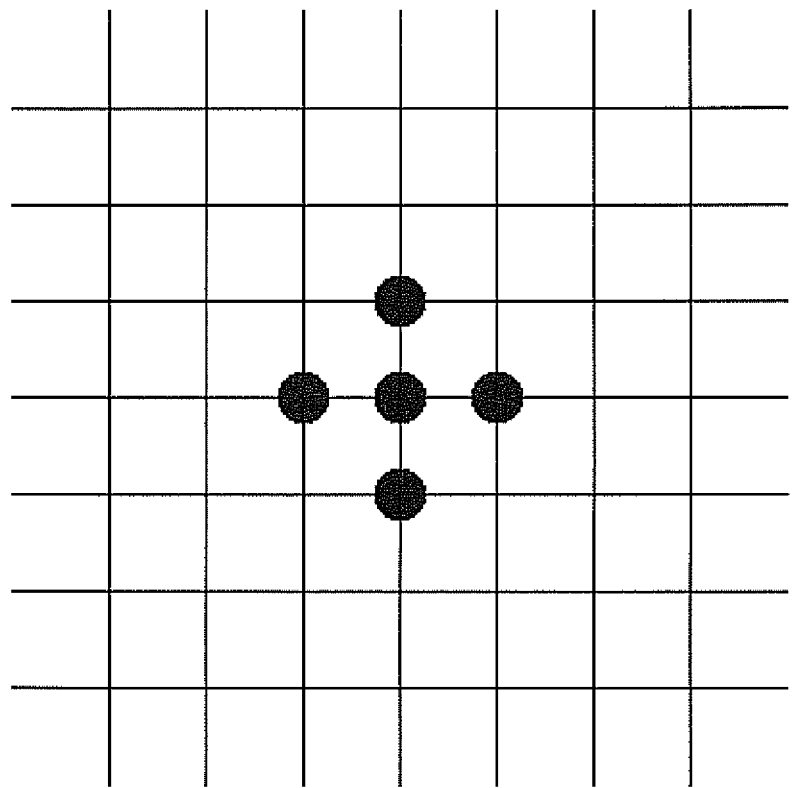

FIGS. 4B-4C illustrate the first two iterations/steps of the 5SDS used in the small diamond search of step 216. In the first iteration of a small diamond search, a search area (in a block in the reference frame) includes five checking points (illustrated as circles) as shown for example in FIG. 4B. The search begins with an examination of the center checking point of the search area. If the minimum SAD is found at the center, then the search is finished. If the pixel with the minimum SAD is not the center of the diamond, a new iteration involving a new diamond is initiated in which a new diamond consists of the checking point with the minimum SAD at the center surrounded by four checking points (some old and some new) with a relative step offset of one (shown in FIG. 4C). In FIG. 4C, the old checking points from the first iteration are illustrated as circles and the new checking points in the second iteration are illustrated as triangles. This process is repeated until the pixel with the minimum SAD is the center of the diamond made up by the checking points or the search iteration reaches four (4). To reduce redundant search step, an effort can be made to monitor the checking points and/or their associated motion vectors to avoid the re-calculation of the SAD of the vector positions that have been calculated previously. Consider, for example, FIG. 4C in which the circles are the checking positions that have been calculated in the previous iteration and the triangles are the additional checking positions that need to be calculated in the present iteration. In this example, only three new SAD calculations are needed in the second iteration as opposed to five SAD calculations required in the first iteration. Because the first SAD calculation was already performed and stored in step 214, there are only four SAD calculations required in the first iteration for the small diamond search.

In terms of computation operations, for a small diamond search, the SAD value calculation for each vector inside the macroblock associated with the first predicted start motion vector requires a maximum of (4+3+3+3)×2=26 operations. This is due to the maximum 4 iterations involved and the geometry of the diamond when the step offset is one which dictates that for each iteration there is one or two checking points that involve a recalculation of a vector position that have been calculated previously.

In step 218, the minimum SAD of the small diamond search is determined. The vector with the minimum SAD and the SAD value associated is stored in memory. Next, it is determined whether a second coarse search is required (step 220). To do so, the distance between the second predicted starting position motion vector and the motion vector having the minimum SAD value calculated and stored in step 218 (the result of the coarse search using the second predicted starting position) is computed and the result compared to a predetermined value. Preferably, this predetermined value is 4 which is selected because it represents a threshold above which the result of the first coarse search may be a local minimum. Hence, a second search is required if:

$$|V0.x - v.x| + |V0.y - v.y| \geq 4 \qquad (2)$$

where V0 is the second predicted starting position (motion vector) and v is the motion vector associated with the minimum SAD stored in step 218.

If a second search is not needed, skip to step 232. On the other hand, if a second search is needed, step 222 is performed to select a second predicted start motion vector associated with a macroblock as the starting position of the second coarse search. Depending on the encoded mode associated with current video macroblock 412 of FIG. 4, either predict start motion vector V0 is set to (0,0) or to the motion vector of 8×8 block 420 whose position relative to the current macroblock in the current frame is illustrated in FIG. 4. As shown in FIG. 4, 8×8 block 420 is the upper right 8×8 block of LEFT macroblock 416 adjacent to current macroblock 412.

In scenario 1, if the encoded mode of current macroblock 412 is set as Intra (a.k.a, I-encoded), typically a whole frame is Intra, no estimation search is performed. In scenario 2, if the encoded mode of current macroblock 412 is set as Inter (a.k.a. P-encoded) and UP macroblock 414 is Inter then starting point V0 is set to the motion vector of UP 8×8 block 418. In scenario 3, if the encoded mode of current macroblock 412 is set as Inter (a.k.a. P-encoded) and UP macroblock 414 is Intra then starting point V0 is set to (0,0). In scenario 4, if the encoded mode of current macroblock 412 is set as Inter (a.k.a. P-encoded) and UP macroblock 414 is out of video range, the current macroblock is considered an I-encoded macroblock and the starting point is set to (0,0).

Alternatively, for scenario 2, the start motion vector V0 can also be set to the motion vector of any of the three remaining 8×8 blocks of LEFT macroblock 416 or to the motion vector of LEFT macroblock 416 itself. Or, the starting point V0 can be set to the motion vector of an 8×8 block in UP macroblock 414 or the motion of UP macroblock 414 itself whose position relative to current macroblock 412 in the current frame 400 is illustrated in FIG. 4 as long as such motion vector is different from the one selected as the first predicted start motion vector (see step 212). Or the starting point V0 can be set to the motion vector of an 8×8 block in another macroblock in the proximity of the current macroblock as long as such motion vector is different from the one selected as the first predicted start motion vector (see step 212). The motion vector of the 8×8 block or the UP macroblock is determined using an 8×8 search algorithm (described, for example, in greater detail in step 232 below) or a 5SDS algorithm (described, for example, in greater detail in step 216 above), respectively.

Using the second predicted start motion vector selected in step 222, a large diamond search is performed (step 224). Because the large diamond search including the checking points is substantially similar to that described in step 214, it is not repeated here. As a result of the large diamond search, the vector and the associated minimum SAD value are stored separately from the vector and associated minimum SAD value that are the result of the first coarse search. Next, using the vector selected and stored in step 224 as the starting position, a small diamond search is performed (step 226). The small diamond search is substantially similar to that performed in step 216 and is not repeated here.

In step 228, the minimum SAD of the small diamond search is determined. The vector with the minimum SAD and the SAD value associated are stored in memory separately from the vector and associated minimum SAD value that are the result of the first coarse search. Next, the minimum SAD value stored in step 218 and the SAD value stored in step 228 are compared to determine the vector with the smallest (minimum) SAD value (step 230). Using the vector with the smallest SAD value determined from step 230 as input, a fine search is performed in step 232. Preferably, the fine search includes an 8×8 diamond search followed by a half-pixel search. In essence, the fine search carries out the search in a narrow area to improve the resolution and accuracy of the search.

Figure 4E:
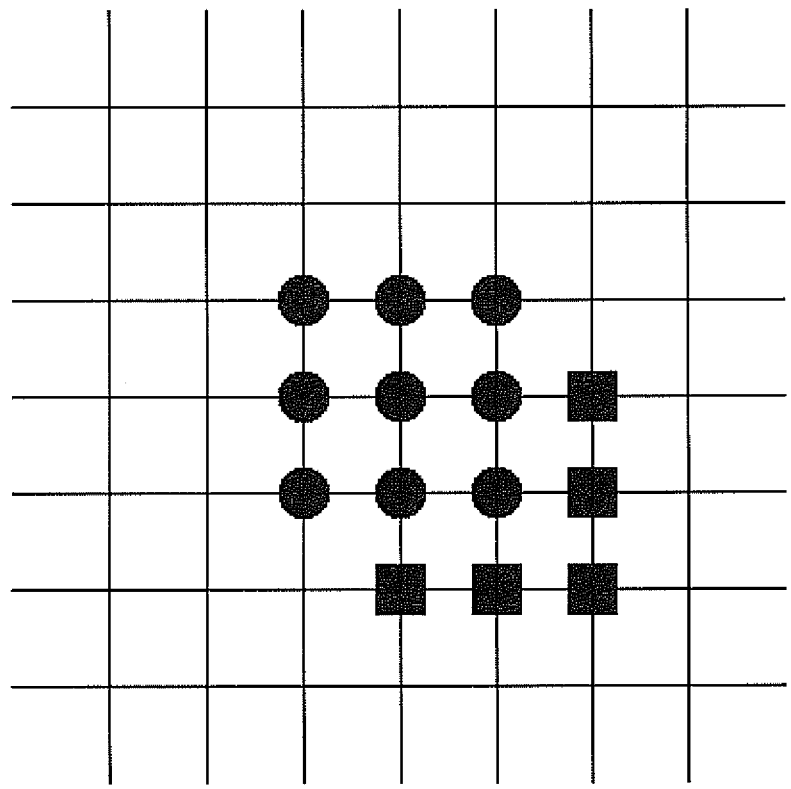
FIGS. 4D-4E illustrate, for example, the two steps of the 8×8 block search of step 218 in accordance with the present invention.
Figure 4D:
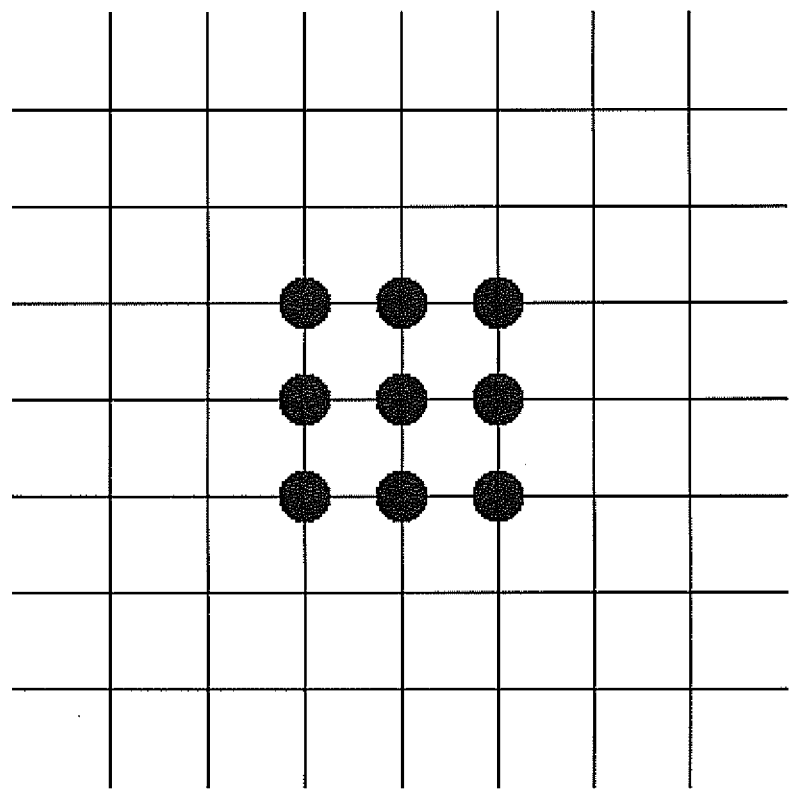

The 8×8 search may be disabled through a programmed register. In an 8×8 search, the search area, where the checking points are located, is reduced from 16×16 pixels (a macroblock) to 8×8 pixels, the number of checking points are nine in a square (instead of diamond) pattern, the center of nine checking points is the vector from step 230, and there are only two steps/iterations. FIGS. 4D-4E illustrate the two iterations involved in the 8×8 search. The 8×8 search basically matches an 8×8 pixels block in the reference frame to an 8×8 block in the current frame. The steps involved in the 8×8 search are as follows. First, the macroblock associated with the vector having the minimum SAD value determined and stored in step 230 is divided into four 8×8 pixels blocks. For each 8×8 pixels block, a search involving nine adjacent checking points (as shown in FIG. 4D) located in an 8×8 pixels block in the current frame is carried out relative to an 8×8 pixels block in the reference frame is determined. In other words, for each 8×8 block in the current frame, the SADs for nine checking points relative to an 8×8 pixels block in the reference frame are computed according to equation (1) with N=8. From the nine SADs computed, a minimum SAD is selected. If the checking point associated with the minimum SAD is the center checking point, the 8×8 search is finished. If the checking point associated with the minimum SAD value is not the center checking point, then a second iteration search involve 9 checking points (some old and some new) is carried out (shown in FIG. 4E). In FIG. 4E, the old checking points from the first iteration are illustrated as circles and the new checking points in the second iteration are illustrated as squares. As shown in FIG. 4E, the nine checking points includes four circles and five squares. From the nine SADs computed according equation (1) in the second iteration, a minimum SAD is selected. For each 8×8 block in the current frame, the minimum SAD value and the motion vector of the associated 8×8 block is stored.

In terms of computation operations, for an 8×8 search, the SAD value calculation for each vector inside the 8×8 pixels block of the reference frame requires a maximum of [(9)×2]+ (5*2)=28 operations.

The sum of the four minimum SADs of the four 8×8 blocks (subdivided from the macroblock) is then computed and stored. In shorthand, this sum can be referred to as ΣSAD(8× 8). Next a determination is made to determine whether ΣSAD (8×8) is greater than the smallest SAD value stored in step 230 minus FAVOR_16×16. FAVOR_16×16 is a weight factor preset to 129 to favor the selection of the minimum SAD associated with a macroblock which is stored in step 230. If it is, the new minimum SAD value is set to ΣSAD(8×8) and set flag mv4flag to 1 to indicate that four motion vectors (MV4) from four 8×8 blocks are used. The four minimum SAD values along with the four motion vectors associated with the four vectors having the minimum SADs are then stored in memory. Otherwise, the vector and the smallest SAD value determined from step 230 are maintained and set flag mv4flag to 0 indicating that only one motion vector is required for each macroblock.

In the preferred embodiment, the half-pixel search is performed as part of the fine search following the 8×8 search. The half-pixel search may be disabled through a programmed register. The same search steps apply whether one macroblock motion vector is involved or four 8×8 pixels block motion vectors are involved. First, flag mv4flag is checked. If mv4flag=0 indicating one macroblock motion vector is involved, the vector with the smallest SAD value stored in step 230 is used as a starting point. In addition, four half-pixel positions (hereinafter half-pixel vectors) relative to the starting point are determined. Hence, assuming the starting vector is (v.x,v.y), then the four half-pixel vectors are (v.x,v.y+½), (v.x,v.y−½), (v.x+½,v.y), and (v.x−½,v.y). The corresponding motion vectors are v, v+(0,½), v−(0,½), v+(½,0), and v−(½,0). These five vectors serve as the five checking vector wherein the step offset is ½ pixel. The intensity value of a half-pixel vector is determined by averaging the intensity values of the top and bottom pixels (whose offset distance is one) or the left and right pixels (whose offset distance is one) between which the half-pixel vector is located. If the half-pixel vector is located in the center of four pixels whose offset distances are one, then the intensity value of that half-pixel vector is determined by averaging the intensity values of these four pixels.

Figure 4G:
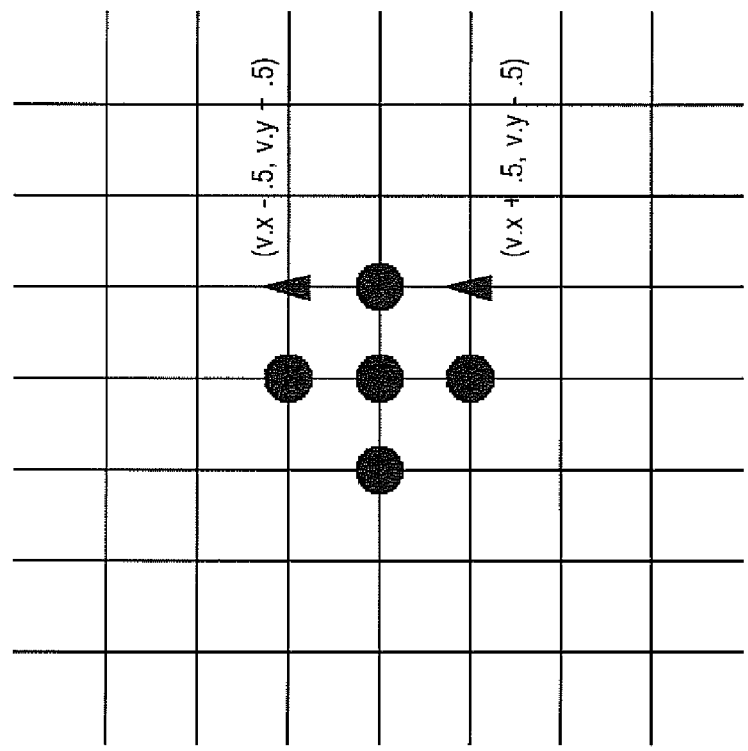
FIGS. 4F-4G illustrate, for example, the two steps of a half-pixel search of step 218 in accordance with the present invention.
Figure 4F:
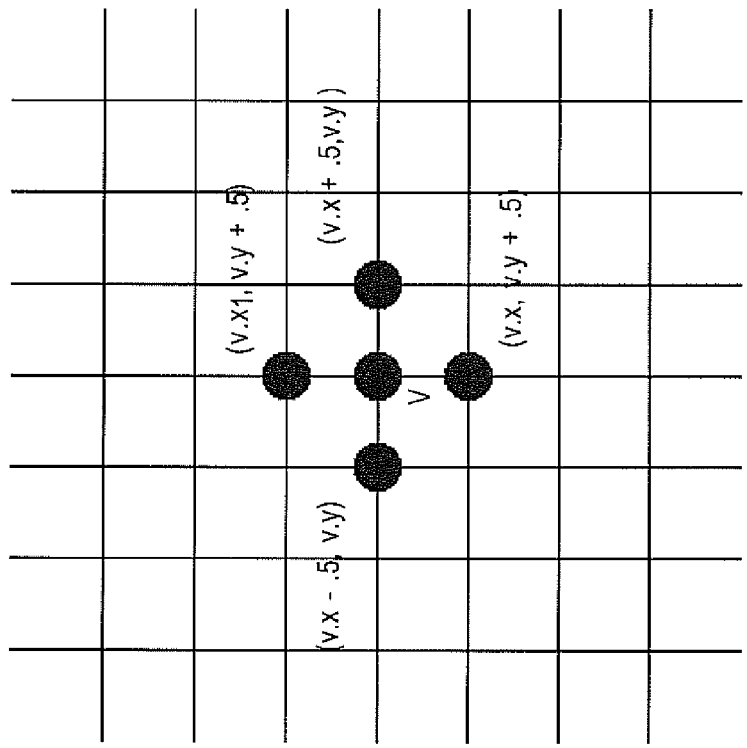

FIG. 4F illustrates the five checking points involved in the first step of a half-pixel search. Equation (1) is used to determine the SAD values for all five checking points. The minimum SAD value is then determined from five SAD values computed. Depending on which checking point yields the minimum SAD value, a second search step in which the SADs for additional checking points may be necessary. Table 1 below shows the additional checking points associated with the five original checking points that are required in the second search step. If a second step is required, the minimum SAD is determined from among the computed SAD values associated with the corresponding additional checking points and the "current" minimum SAD value determined from the five original checking points. FIG. 4G illustrates the second step scenario where the checking point with the minimum SAD is (v.x+½,v.y). The minimum SAD and the vector having the minimum SAD is stored in memory.

TABLE 1

| Checking Point With Minimum SAD | Additional Checking Points Required |
|---|---|
| (v.x, v.y) | No Additional Checking Point |
| (v.x + ½, v.y) | (v.x + ½, v.y ± ½) |
| (v.x − ½, v.y) | (v.x − ½, v.y ± ½) |
| (v.x, v.y + ½) | (v.x ± ½, v.y + ½) |
| (v.x, v.y − ½) | (v.x ± ½, v.y − ½) |

Conversely, if mv4flag=1 indicating that four motion vectors are required for each macroblock, the same two steps search described above is applied to each 8×8 pixels block. For each 8×8 pixels block, the vector with the smallest SAD value stored in system memory at the conclusion of the 8×8 search is used as a starting point. In addition, four half-pixel vectors relative to the starting point are determined. Hence, assuming the starting vector is (v.x,v.y), then the four half-pixel vectors are (v.x,v.y+½), (v.x,v.y−½), (v.x+½,v.y), and (v.x−½,v.y). The corresponding motion vectors are v, v+(0, ½), v−(0,½), v+(½,0), and v−(½,0). These five vectors serve as the five checking vector wherein the step offset is ½ pixel. FIG. 4F illustrates the five checking points involved in a half-pixel search. Equation (1) is used to determine the SAD values for all five checking points except N=8 to limit the search area to a 8×8 block. The minimum SAD value is then determined from five SAD values computed. Depending on which checking point yields the minimum SAD value, a second search step in which the SADs for additional checking points may be necessary. Table 1 above shows the additional checking points associated with the five original checking points that are required in the second search step. If a second step is required, the minimum SAD is determined from among the computed SAD values associated with the corresponding additional checking points and the "current" minimum SAD value determined from the five original checking points.

After the half-pixel searches for all four motion vectors associated with four 8×8 pixels blocks are carried out, the four computed "minimum" SADs are compared to each other to determine the smallest SAD value and the vector with this smallest SAD value. These information are stored in memory and provided to rate control module 711 ending the serial motion estimation process in accordance with the present invention.

In terms of computation operations, for the half-pixel search, the worst case scenario is when 4 motion vectors are involved. In this case, the SAD value calculation for each vector in the half-pixel search requires 4*(1+1+1) operations for the first step and 2*(3+1+1) operations for the second step. The total number of operations per pixel for the half-pixel search are 22. The calculations include the half pixel interpolation as well as operations required for SAD calculation. The total number of operations for the entire motion compensated estimation process (assuming two coarse searches) in accordance with the present invention are 122.

Figure 3:
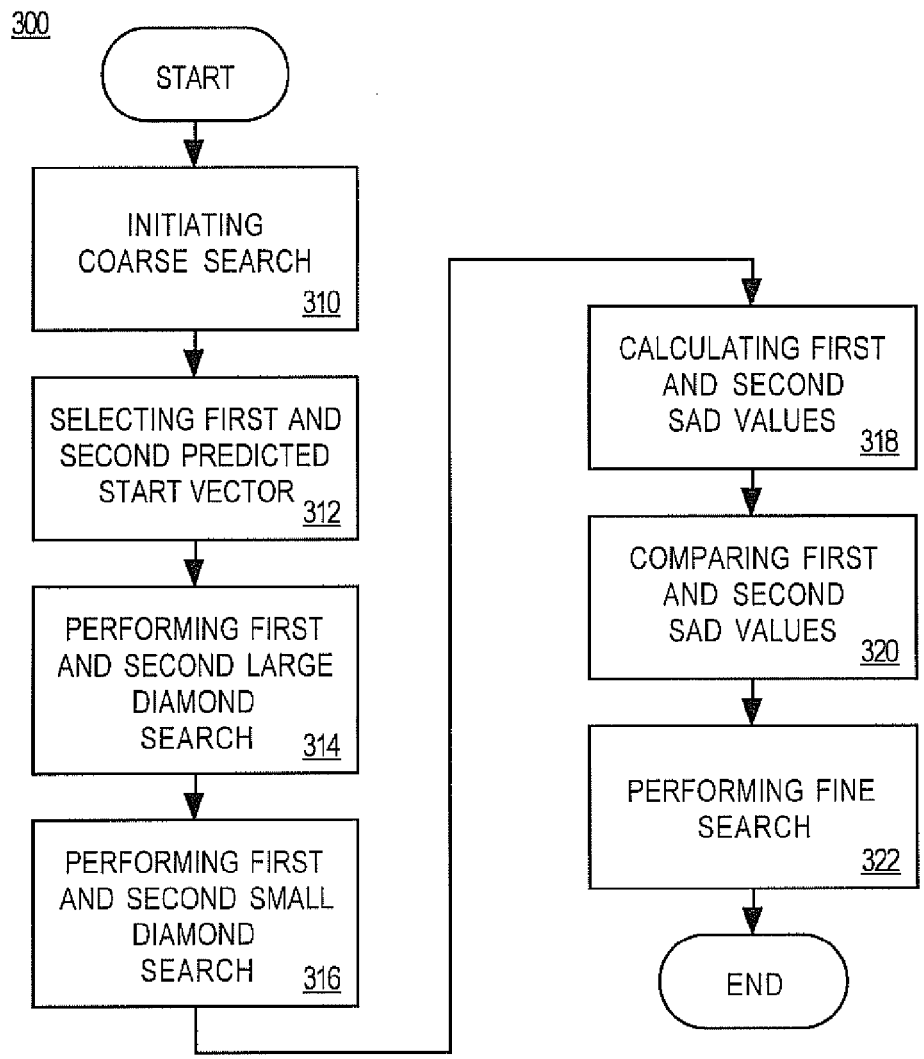
FIG. 3 is a high level flow chart of the steps carried out in the parallel searches embodiment of the present invention.

Referring now to FIG. 3 illustrating a high level flow chart of the steps carried out in the parallel searches embodiment of the present invention. In step 310, a coarse motion estimation search is initiated. In the preferred embodiment, a coarse search involves diamond searches that involve five checking points. Other types of coarse searches may be implemented as well. Next, in step 212, a first predicted start motion vector associated with a first macroblock and a second predicted start motion vector associated with a second macroblock are selected as the starting positions of the coarse search. The selection of the first and second starting points are substantially similar to that discussed in the sequential searches embodiment of FIG. 2 and are not further discussed here.

Two large diamond searches which are substantially similar to steps 214 and 224 of FIG. 2, are performed concurrently using the first and second predicted start motion vectors (step 314). From the SADs calculated for each checking point relative to the pixels within the macroblock inside the reference frame, the vectors with the minimum SADs and the corresponding SAD values related to the first and second predicted start motion vectors are selected and stored. Next, in step 316, two small diamond searches, which are substantially similar to steps 216 and 226 of FIG. 2, are performed concurrently using the vectors and the corresponding minimum SADs values determined in step 314. In step 318, the minimum SAD values of the two small diamond searches are determined. The vectors with the minimum SADs and the associated SAD values are stored in system memory.

Next, the minimum SAD values determined from the two small diamond searches are compared against each other (step 320). Using the vector with the smaller SAD value determined from step 320 as input, a fine search is performed in step 322. The fine search includes an 8×8 search and a half-pixel search which are substantially similar to those in step 232 of the FIG. 2. The fine search outputs a minimum SAD value along with the associated vector which are stored and passed to a motion compensation engine ending the parallel motion estimation process in accordance with the present invention.

Figure 5:
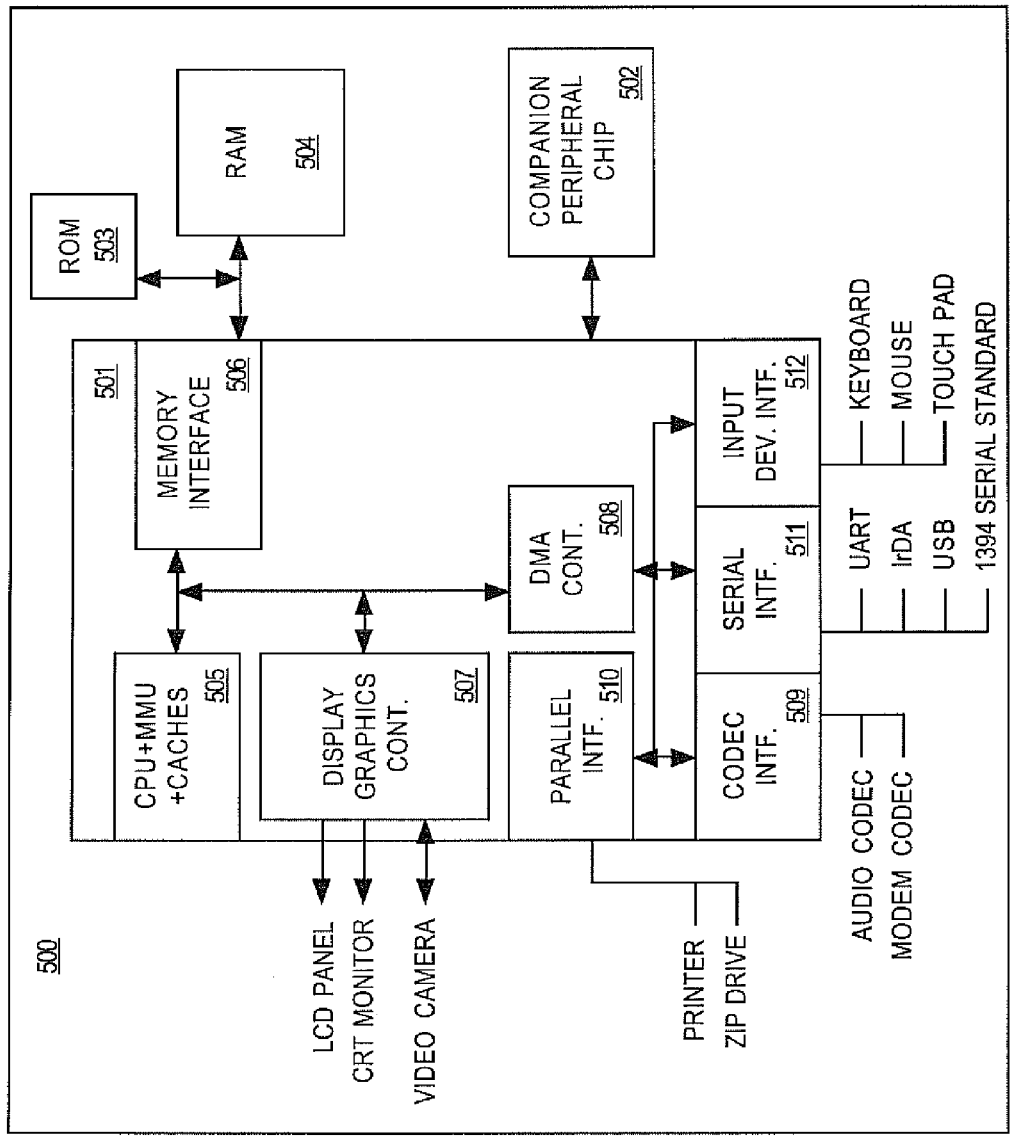
FIG. 5 illustrates, as an example, a high-level diagram of computer system 500 in which the present invention may be implemented or practiced.

Reference is now made to FIG. 5 illustrates, as an example, a high-level diagram of computer system 500 in which the present invention may be implemented or practiced. More particularly, computer system 500 may be a laptop or handheld computer system. It is to be appreciated that computer system 500 is exemplary only and that the present invention can operate within a number of different computer systems including desktop computer systems, general-purpose computer systems, embedded computer systems, and others.

As shown in FIG. 5, computer system 500 is a highly integrated system which includes of integrated processor circuit 501, peripheral controller 502, read-only-memory (ROM) 503, and random access memory (RAM) 504. The highly integrated architecture allows power to be conserved. Peripheral controller 502 is optional if there is a need to interface with complex and/or high pin-count peripherals that are not provided in integrated processor circuit 501.

While peripheral controller 502 is connected to integrated processor circuit 501 on one end, ROM 503 and RAM 504 are connected to integrated processor circuit 501 on the other end. Integrated processor circuit 501 comprises a processing unit 505, memory interface 506, graphics/display controller 507, direct memory access (DMA) controller 508, and core logic functions including encoder/decoder (CODEC) interface 509, parallel interface 510, serial interface 511, and input device interface 512. Processing unit 505 integrates a central processing unit (CPU), a memory management unit (MMU), together with instruction/data caches.

CODEC interface 509 provides the interface for an audio source and/or modem to connect to integrated processor circuit 501. Parallel interface 510 allows parallel input/output (I/O) devices such as hard disks, printers, etc. to connect to integrated processor circuit 501. Serial interface 511 provides the interface for serial I/O devices such as Universal Asynchronous Receiver Transmitter (UART), Universal Serial Bus (USB), and Firewire (IEEE 1394) to connect to integrated processor circuit 501. Input device interface 512 provides the interface for input devices such as keyboard, mouse, and touch pad to connect to integrated processor circuit 501.

DMA controller 508 accesses data stored in RAM 504 via memory interface 506 and provides the data to peripheral devices connected to CODEC interface 509, parallel interface 510, serial interface 511, or input device interface 512. DMA controller 508 also sends data from CODEC interface 509, parallel interface 510, serial interface 511, and input device interface 512 to RAM 504 via memory interface 506. Graphics/display controller 507 requests and accesses the video/graphics data from RAM 504 via memory interface 506. Graphics/display controller 507 then processes the data, formats the processed data, and sends the formatted data to a display device such as a liquid crystal display (LCD), a cathode ray tube (CRT), or a television (TV) monitor. In computer system 500, a single memory bus is used to connect integrated processor circuit 501 to ROM 503 and RAM 504.

Figure 6:
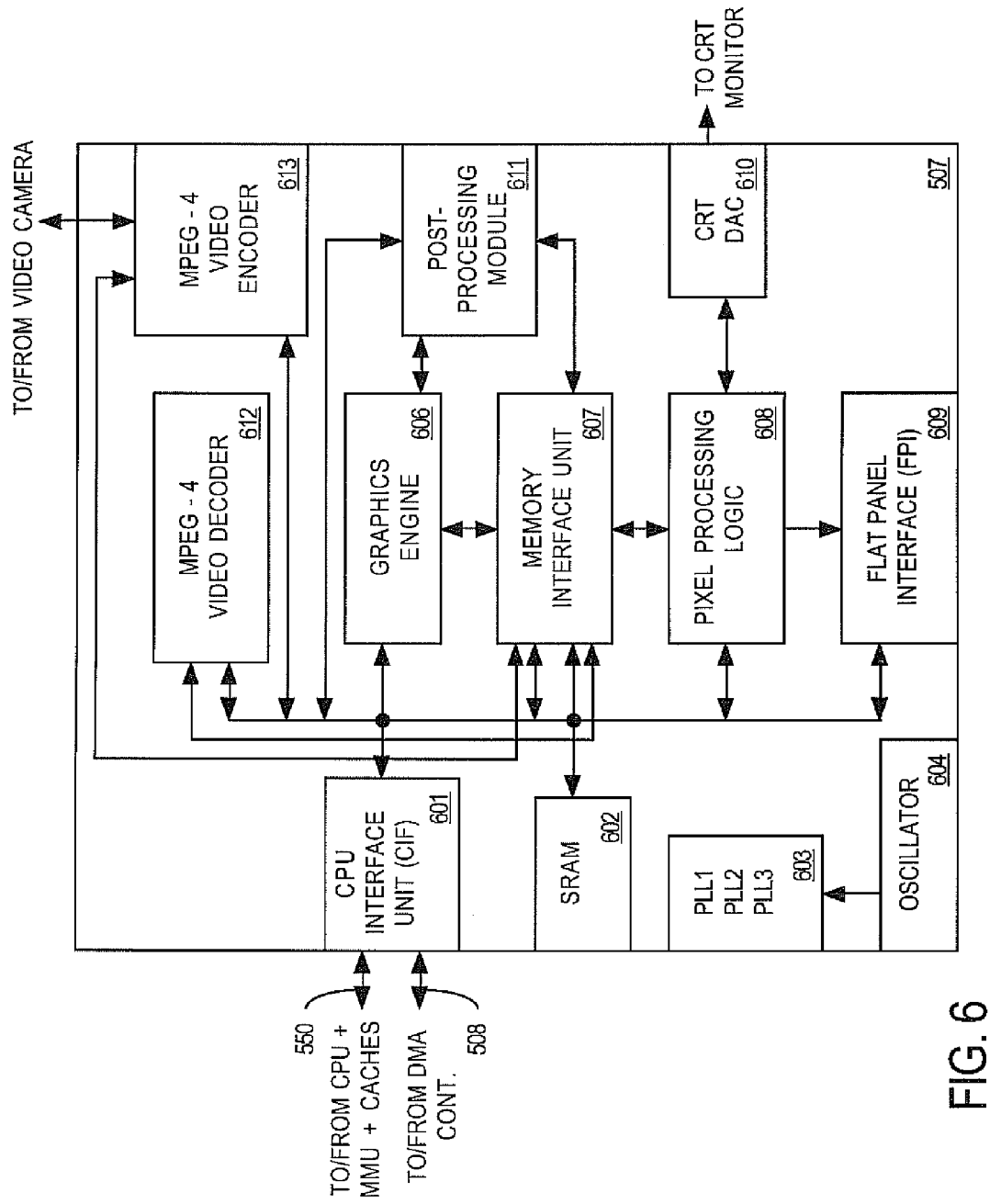
FIG. 6 illustrates in greater detail graphics/display controller 507 that implements an embodiment of the present invention.

In the preferred embodiment, the present invention is implemented as part of graphics/display controller 507. Reference is now made to FIG. 6 illustrating in greater detail graphics/display controller 507. In general, graphics/display controller 507 comprises CPU Interface Unit (CIF) 601, SRAM 602, Phase Lock Loop (PLL) circuit 603, oscillator 604, pixel processing logic 608, Graphics Engine (GE) 606, Memory Interface Unit (MIU) 607, Flat Panel Interface (FPI) 609, CRT Digital-to-Analog Converter (DAC) 610, post-processing module 611, MPEG-4 video decoder 612, and MPEG-4 video encoder 613. Graphics/display controller 507 further includes a video input port to accommodate a video camera. CIF 601 provides the interface to processing unit 505 and DMA controller 508. Accordingly, CIF 601 routes requests and video/image data received from processing unit 505 to the desired destination. In particular, CIF 601 sends register read/write requests and memory read/write requests from the host CPU processing unit 505 and DMA controller 508 to the appropriate modules in graphics/display controller 507. For example, memory read/write requests are passed on to MIU 607 which in turn reads/writes the data from/to the frame buffer in SRAM 602. CIF 601 also serves as the liaison with DMA controller 508 to fetch data from system memory (ROM 503 and RAM 504) and provides the data to GE 606 and MIU 607. Further, CIF 601 has a number of control registers which can be programmed by the host CPU in processing unit 505 to control the MPEG post-processing process (e.g., the content of some of the control registers may be used to configure MPEG-4 decoder 612). CIF 601 also passes compressed video/image bitstream to MPEG-4 decoder 612 to perform image construction/decompression. CIF 601 further passes uncompressed video/image bitstream received from a source connected to codec interface 509 or serial interface 511 to MPEG-4 encoder to perform compression before the compressed bitstream can be transmitted to a device connected directly or remotely to integrated processor circuit 501. Accordingly, MPEG-4 encoder 613 implements the motion estimation technique of the present invention.

The frame buffer in SRAM 602 is used to store the pixmap (i.e., a pixel pattern mapped into the frame buffer) of the image to be displayed on the monitor as well to act as a temporary buffer for various purposes. Additionally, SRAM 602 may have memory allocated for video buffers and transactional registers. The transactional registers can be used to store quantization factors for each block of video image pixel data. However, the transactional registers used in storing quantization factors are preferably implemented inside MPEG-4 decoder 612. GE 606 processes graphics/video image data which is then stored in the buffer in SRAM 602 based on commands issued by the host CPU. GE 606 performs graphics operations (e.g., BitBLTs and ROPs, area fills, line drawing) and provides hardware support for clipping, transparency, rotation, and color expansion. In the present embodiment, GE 606 through a built-in Stretch Block Transfer (STRBLT) function further performs video image expansion, progressive scanning conversion, YcbCr (YUV) to RGB color-space conversion, etc. In short, GE 606 frees processing unit 505 from the video/image display rendering function to allow processing unit 505 to perform time-critical or real-time operations.

MIU 607 controls all read and write transactions from/to the frame buffer, video buffers, and transactional registers in SRAM 602. Such read and write requests may come from the host CPU via CIF 601, GE 606, pixel processing logic 608, FPI 609, etc. In addition, MIU 607 performs tasks associated with memory addressing, memory timing control, and others. Post-processing module 611 removes blocking and ringing artifacts from decompressed MPEG video image data to improve the quality of the decompressed video data. The decompressed MPEG video image data can be received from, for example, an optical media player via serial interface 511 or MPEG-4 decoder 612. The filtered video image data is then sent to SRAM 602.

Pixel processing logic 608 retrieves video/image data from the buffers in SRAM 602 via MIU 607, serializes the image data into pixels, and formats the pixels into predetermined formats before outputting them to FPI 609 or CRT DAC 610. Accordingly, pixel processing logic 608 generates the required horizontal and vertical display timing signals, memory addresses, read requests, and control signals to access image data stored in SRAM 602. If the display device involved is a LCD, pixel data from pixel processing logic 608 is sent to FPI 609 before being passed on to the LCD. FPI 609 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 609 formats the data to suit the type of display.

Furthermore, FPI 609 allows color data to be converted into monochrome data in the event a monochrome LCD is used. Conversely, if the display device is a cathode ray tube (CRT), pixel data is provided to CRT digital-to-analog converter (DAC) 610 prior to being sent to the CRT. CRT DAC 610 converts digital pixel data from pixel processing logic 608 to analog Red Green and Blue (RGB) signals to be displayed on the CRT monitor.

Figure 7:
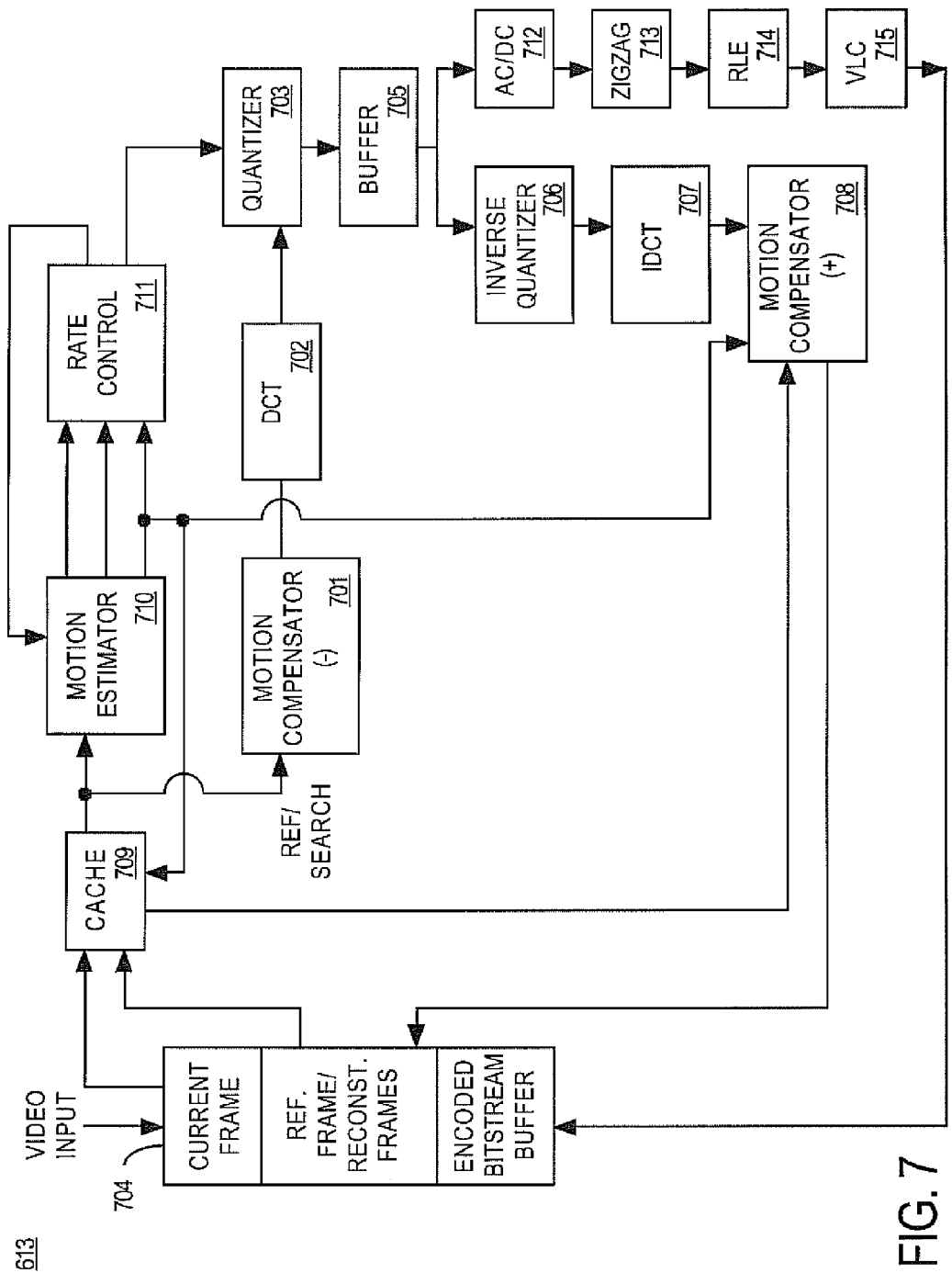
FIG. 7 illustrates a block diagram of MPEG Video encoder 613 that implements an embodiment of the present invention.

Reference is now made to FIG. 7 illustrating in greater detail exemplary MPEG-4 video encoder 613 that implements an embodiment of the present invention. As shown in FIG. 7, MPEG-4 video encoder 613 includes motion compensator (−) (MC−) 701, DCT module 702, quantizer 703, memory 704, buffer 705, inverse quantizer 706, Inverse DCT (IDCT) module 707, motion compensator (+) (MC+) 708, cache 709, motion estimator 710, rate control module 711, alternative coefficient/discrete coefficient (AC/DC) module 712, zigzag (ZZ) module 713, run-length coding (RLE) module 714, and variable length coding (VLC) 715.

Video input from a source such as a video camera connected to system 500 is provided to memory 704. The video input from the source is the current video frame data. Preferably, memory 704 is separated into a current frame area to store data from the current video input, a reference frame/reconstructed frames area to store data from the reference video frame and data from a video frame reconstructed from compression, and an encoded bitstream buffer to store data from a freshly encoded video frame by encoder 613. Cache 709 fetches current video frame data from memory 704 one macroblock at a time and reference video frame data several macroblocks at a time (these several macroblocks are adjacent neighbors). Cache 709 receives as input the motion vectors associated with the "good" match video block determined from motion estimator 710. Cache 709 provides data from the current video frame and data from the reference video frame to MC− 701 and motion estimator 710 based on the motion vectors of the "good" match video block received. Cache 709 also provides data from the reference video frame to MC+ 708 based on the motion vectors of the "good" match video block received.

MC− 701 is essentially a subtractor in which prediction data from a reference video frame is subtracted from data from a current video frame, which has been presented in the correct order for encoding according to the desired Group Of Pictures (GOP) structure. The subtractor is disabled (e.g., the prediction is set to zero) for I-frames or I-macroblocks. The output of MC− 701, which is the prediction error (or the video input in the case of I-frames), is passed to DCT module 702 which performs the Discreet Cosine Transformation and outputs DCT coefficients to quantizer 703. Quantizer 703 carries out the quantization process which may be generalized as a step to weight the DCT coefficients based on the amount of noise that the human eye can tolerate at each spatial frequency so that a reduced set of coefficients can be generated. The quantized DCT coefficients are provided to buffer 705 for temporary storage before they are passed on to AC/DC module 712 and inverse quantizer 706. AC is typically defined as a DCT coefficient for which the frequency in one or both dimensions is non-zero (higher frequency). DC is typically defined as a DCT coefficient for which the frequency is zero (low frequency) in both dimensions. AC/DC module 712 predicts the AC and DC for the current block based on AC and DC values of adjacent blocks such as an adjacent left top block, a top block, and an adjacent left block. For example, the prediction can be made as follows:

if($|a-c|<|a-b|$) then x=b else x=c where a is the AC or DC value of the left top block relative to the current block, b is the AC or DC value of the top block relative to the current block, c is the AC or DC value of the left block relative to the current block, and x is the AC or DC value of the current block.

Such predictions are described in "MPEG-4 Information Technology-Coding of Audio-Visual Objects-Part 2: Visual" ISO/IEC/14496-2:1999 which is herein incorporated by reference.

AC/DC module 712 provides the AC and DC predicted coefficients to ZZ module 713 which forms a 64-elements long vector such that the low frequency (e.g., DC) components are placed at the beginning of the vector. ZZ module 713 provides the 64-elements vector to RLE module 714 which basically determines the number of consecutive zeros in the vector and forms RLE acceptable words based on the determination. After quantization, there are likely a significant number of zeros (likely to be the high frequency components) in the block and there is no need to transmit or store such information. Accordingly, a RLE word represents the number of zeros between consecutive non-zero elements in the vector. The RLE word also includes the value of the last non-zero element after the zeros and information indicating whether this value is the very last component in the vector.

The RLE words are provided to VLC module 704 which maps RLE words into VLC patterns. For example, certain RLE words are given specific bit pattern. The most common RLE words are given the shortest VLC bit pattern. VLC patterns are specified in MPEG-4 standard. (See "MPEG-4 Information Technology-Coding of Audio-Visual Objects-Part 2: Visual" ISO/IEC/14496-2:1999). Run-length and variable-length coding (the combination coding is commonly referred to as Huffman coding). In general, due to the non-uniform distribution of the DCT coefficients wherein most of the non-zero DCT coefficients of an image tend to be located in a general area, VLC and run-length encoding are used to exploit this distribution characteristic to identify non-zero DCT coefficients from zero DCT coefficients. In so doing, redundant/predictable information can be removed. The encoded (i.e., compressed) block of video frame data is then sent to memory 704 for storing in the encoded frame cache.

The process of motion compensated prediction requires a signal on which to base the prediction. This signal represents the reference/previous video frame data which is stored in the reference cache of memory 704. To ensure that the prediction process in MPEG-4 video encoder 613 bases its prediction on a signal that is substantially similar to that available in MPEG-4 video decoder 612 (i.e., a remote video decoder), a local decoder is included in video encoder 613 to generate a locally decoded signal in the encoder. The local decoder, which consists of inverse quantizer 706, IDCT 707, and MC+ 708, basically undoes the encoding stages of quantizer 703 and DCT 702 to produce a decoded prediction error and adds it back into a suitably delayed version of the prediction (reference frame) data to produce a locally decoded (reconstructed) signal with motion compensation. The delayed prediction data is provided by cache 709.

The reconstructed signal is sent to the reconstruction cache of memory 704 for storage. For each macroblock in the current video frame, motion estimator 710, which implements the present invention, searches for a "good" matched macroblock in the reference video frame based on a minimum SAD value. Motion estimator 710 receives as input blocks of current frame and reference frame data. Motion estimator 710 also receives a signal indicating the frame type from rate control module 711. Motion estimator 710 also determines the motion vector. Motion estimator 710 further determines whether a macroblock in the current video frame is intra (encoded independently) or inter (encoded after motion compensation). These determinations are communicated to rate control module 711. The motion vector determinations are communicated to cache 709 and MC+ 708.

The rate of the bitstream output by VLC module 704 fluctuates over time depending on the content of the video data (i.e., changing scenes and objects). This variable bit rate is undesirable because the primary object of MPEG coding is to generate a constant bit rate to fit the available channel or in the case of statistical multiplexing to share a constant bit rate between several video signals. It is then important to ensure that the average bit-rate of the buffer input is the same as that of the channel and neither buffer overflows or underflows. Rate control module 711 is used to control the average bit rate at the bitstream buffer in memory 704 to stay inside an acceptable limit range to prevent overflow and underflow. To achieve the average bit rate control, rate control module 711 varies the quantization factors in quantizer 703 and AC/DC module 712. While coarser scale generates a lower average bit rate, at the expense of picture quality, a finer scale produces better pictures but at a higher average bit rate. As the buffer fills, quantizer 703 and AC/DC module 712 get coarser, which tends to reduce the average bit rate, helping the buffer to empty. Additionally, rate control module 711 takes into consideration the expected differences (e.g., through modeling projection) in bit rates generated by I and P frames.

Figure 8:
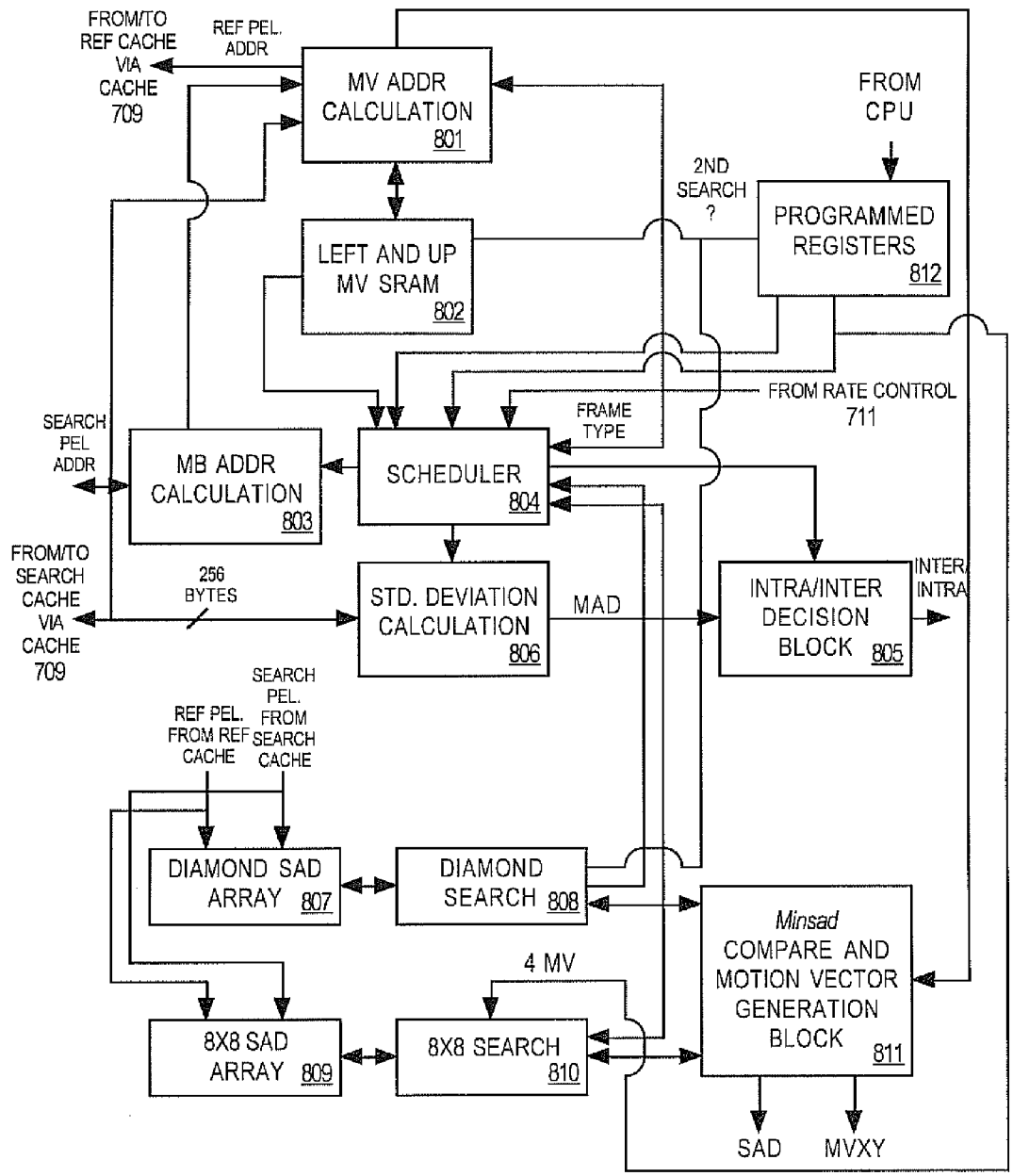
FIG. 8 illustrates in greater detail a block diagram of motion compensated estimator 710 that implements an embodiment of the present invention

Referring to FIG. 8 illustrating a block diagram of the relevant components of an exemplary embodiment of motion estimator 710 which implements the present invention. As shown in FIG. 710, motion estimator 710 comprises motion vector calculator 801, SRAM 802, macroblock address calculator 803, scheduler 804, intra/inter decision block 805, standard deviation calculator 806, diamond SAD array 807, diamond search controller 808, 8×8 SAD array 809, 8×8 search controller 810, compare & motion vector generation block 811, and programmed registers 812. Motion vector calculator 801 receives reference pixel address information and search pixel address information from a reference cache and a search cache (both not shown) that store a reference video frame and a current video frame, respectively. Using the pixel address information, motion vector calculator 801 determines the motion vectors between corresponding macroblocks in the reference frame and the current frame during a search process controlled by scheduler 804. Motion vector calculator 801 provides the motion vector information determined to the reference cache, the search cache, SRAM 802, scheduler 804, and compare & motion vector generation module 811.

Macroblock address calculator 803 receives a signal from scheduler 804 and search pixel addresses from the search cache. Calculator 803 computes the address of the search (current) block (macroblocks or 8×8 blocks) which contains the search pixel addresses based on the signal from scheduler 804 and provides the macroblock addresses to motion vector calculator 801 for determining the motion vectors of the corresponding blocks. As an example, the signal from scheduler 804 may involve information related to checking points that allows macroblock address calculator 803 to determine which macroblock address to compute.

In the preferred embodiment, SRAM 802 stores the motion vector for the 8×8 pixels block related to the LEFT macroblock and/or the motion vector for the 8×8 pixels block related to the UP macroblocks relative to the current macroblock in the current video frame. SRAM 802 is updated after each current macroblock is finished. The motion vectors for the UP and LEFT macroblocks are used as first and second predicted start vectors, respectively, in accordance with the preferred embodiment of the present invention. Whether one or two predicted start vectors are provided by SRAM 802 depends on a signal provided by programmed registers 812 which is controlled by the CPU. SRAM 802 provides either the UP or LEFT motion vector as the predicted start vector to scheduler 804 and diamond search controller 808. Using the predicted start vector from SRAM 802, current minimum SAD from compare & motion vector generation module 811, the associated motion vectors from motion vector calculator 801, together with reference and current (search) pixel information (e.g., intensity level for a pixel), which are stored in diamond SAD array 807 in a format recognizable by diamond search controller 808, diamond search controller 808 carries out the steps of a large diamond search and a small diamond search that were discussed earlier. Whether a large diamond search or small diamond search is performed depends on the instruction given by scheduler 804. Scheduler 804 also provides diamond search controller with the offset step (e.g., four, one, or one-half pixel), the checking points, and constant FAVOR_0. The minimum SAD value Minsad computed from the large diamond search or small diamond search by diamond search controller 808 is passed to compare & motion vector generation module 811 which monitors and stores the minimum SAD during the entire motion estimation process as well as monitors and stores the motion vector associated with the block (either macroblock or 8×8 block) in which the minimum SAD locates. Compare & motion vector generation module 811 outputs the updated minimum SAD value and the associated motion vector. For the small diamond search, diamond search controller 808 further receives the updated minimum SAD value and the associated motion vector resulted from the large diamond search from compare & motion vector generation module 811. Diamond search controller 808 also receives a signal indicating whether a second search (see step 220 of FIG. 2) using a second predicted starting vector is to be carried out from programmed registers 812.

Using reference and current (search) pixel information (e.g., intensity level for a pixel), which are stored in 8×8 SAD array 809 in a format recognizable by 8×8 search controller 810, and the updated minimum SAD value together with the associated motion vector resulted from the small diamond search from compare and motion vector generation module 811, 8×8 search controller 810 carries out the steps of a 8×8 search that was discussed earlier. Scheduler 804 initiates the 8×8 search process carried out by 8×8 search controller 810. Scheduler 804 also provides 8×8 search controller 810 with the offset step, the value of FAVOR$_{13}$ 16×16, and the checking points. The minimum SAD value Minsad computed from each 8×8 search by controller 810 is used to compute ΣSAD (8×8) which is then compared against [SAD(16×16)−FAVOR_16×16]. Depending on the result of the comparison, either the SAD and the motion vector of one macroblock or four SADs and motion vectors of four 8×8 blocks are provided to compare & motion vector generation module 811. 8×8 search controller 810 also provides signal mv4flag to scheduler 804 indicating whether four 8×8 block motion vectors or one macroblock motion vector are used.

Diamond search controller 808 also performs the half-pixel search discussed earlier in step 232 using inputs such as the four minimum SAD values and the associated motion vectors for the four 8×8 pixels blocks (or the minimum SAD value and the associated motion vectors for the macroblock) from compare & motion vector generation module 811, the offset step and the checking points from scheduler 804, and reference and current (search) pixel information (e.g., intensity level for a pixel), which are stored in diamond SAD array 807. Scheduler 804 initiates the half-pixel search carried out by diamond search controller 808 and indicates whether such half-pixel search involves one motion vector for a macroblock or four motion vectors for four 8×8 blocks. The minimum SAD value Minsad computed from the diamond search controller 808 is passed to compare & motion vector generation module 811 which monitors and stores the minimum SAD during the entire motion estimation process as well as monitors and stores motion vectors (e.g., associated with the block, which may be either macroblock or 8×8 pixels, in which the minimum SAD locates, checking points etc.). Compare & motion vector generation module 811 outputs the minimum SAD value and the associated motion vector.

From the discussion above, scheduler 804 monitors and controls the motion estimation process in accordance with the present invention. Hence, scheduler 804 is a state machine that can be configured to carry out the steps of either FIG. 2 (i.e., carry out the motion estimation process serially) or FIG. 3 (i.e., carry out the motion estimation process in parallel). If a serial motion estimation process is implemented, scheduler 804 also determines whether a second coarse search is to be carried out. Scheduler 804 receives as input at least the first and second predicted start points from SRAM 802, signal indicating whether an 8×8 search is enabled from programmed registers 812, signal indicating whether a half-pixel search is enabled from programmed registers 812, and the frame type signal from rate control module 711. If a parallel motion estimation process is implemented, it should be clear to a person of ordinary skill in the art that at least some of the modules of motion estimator 710 are duplicated so that two concurrent coarse searches can be carried out. Which modules need to be duplicated should be clear to a person of ordinary skill in the art and are not further discussed here for brevity sake.

Standard deviation calculator 806 receives pixel information (e.g., pixel coordinates, intensity, etc.) from the search cache storing the current video frame from scheduler 804. When the motion estimation process is complete, standard deviation calculator 806 computes the Mean And Standard Deviation (MAD) according to:

$$MAD = (1/256) * \sum_{j,k=1} \left| I_v(j,k) - (1/256) * \sum_{p,q=1} I_v(p,q) \right| \quad (3)$$

where $I_v(j,k)$ and $I_v(p,q)$ are the intensity level of the pixels inside a macroblock and N is 16 (the number of rows and the number of columns in macroblock).

This MAD value is provided as an input to Intra/inter decision module 805 which additionally receives the final minimum SAD value (resulted from the motion compensated estimation process) from compare & motion vector generation block 811 via scheduler 804, intra/inter decision block 805 determines whether the macroblock is I-encoded or P-encoded (i.e., I coding mode or P coding mode) and outputs intra/inter signal to so indicate.

Preferably, intra/inter decision module 805 indicates that a macroblock is I-encoded if the MAD value is less than or equal to the minimum SAD value. If the macroblock is I-encoded, the motion vector is set to zero and the minimum SAD value of the motion compensated estimation process is set to the MAD value. Otherwise, intra/inter decision module 805 indicates that the macroblock is P-encoded if the MAD value is greater than the minimum SAD value. If the macroblock is P-encoded, the minimum SAD value and its associated motion vector currently stored in compare and motion vector generation module 811 are output.

An embodiment of the present invention, a system, apparatus, and method to perform motion estimation using two predicted start points is presented. While the present inven-

What is claimed is:

1. A method for video motion estimation, said method comprising:
selecting a first predict start point in a search frame and a second predict start point in the search frame;
using the first predict start point, performing a first coarse search to select a first block in the search frame that is a better match to a reference block in a reference frame than at least one other block in the search frame to the reference block, wherein said performing said first coarse search further comprises performing said first coarse search using an electronic device;
determining, based on a distance between a motion vector associated with said first block and a motion vector associated with said second predict start point, whether a second coarse search is needed; and
if said second coarse search is needed, using information associated with the first block and the second predict start point, performing said second coarse search to enable selection of a second block in the search frame that is a better match to the reference block than the first block to the reference block, wherein said performing said second coarse search further comprises performing said second coarse search using said electronic device.

2. The method of claim 1 further comprising:
using information associated with the second block, performing a fine search to enable selection of a third block in the search frame that is a better match to the reference block than the second block to the reference block.

3. The method of claim 2 further comprising:
if the second coarse search is not needed, skipping the second coarse search and performing the fine search.

4. The method of claim 1, wherein the first and second coarse searches each comprise a respective large diamond search and a respective small diamond search, wherein the respective small diamond searches are performed based on information generated by the respective large diamond searches.

5. The method of claim 4, wherein the large diamond search and the small diamond search are based on a 5SDS search.

6. The method of claim 2, wherein the fine search involves an 8×8 block search and a half-pixel search, wherein the half-pixel search is performed based on information generated by the 8×8 block search.

7. The method of claim 1, wherein the first predicted start position is based on a block adjacent to and on a first side of the reference block, and the second predicted start position is based on a block adjacent to and on a second side of the reference block.

8. The method of claim 1, wherein said first coarse search comprises performing respective Sum of Absolute Difference (SAD) calculations for a plurality of blocks of said search frame to determine how well each of said plurality of blocks matches said reference block.

9. A method for video motion estimation, the method comprising:
selecting a first predict start point in a search frame and a second predict start point in the search frame;
using the first predict start point and the second predict start point in the search frame, concurrently performing a first large diamond search and a second large diamond search to select a first block in the search frame and a second block in the search frame that are better matches to a reference block in a reference frame than at least one other block in the search frame to the reference block, wherein said concurrently performing said first large diamond search and said second large diamond search further comprises performing said first large diamond and said second large diamond search using an electronic device;
using information associated with the first and second blocks, concurrently performing a first small diamond search and a second small diamond search to select a third block in the search frame and a fourth block in the search frame that are better matches to the reference block than said first and second blocks to the reference block, wherein the first small diamond search is based on information from the first large diamond search and the second small diamond search is based on information from the second large diamond search, wherein said concurrently performing said first small diamond search and said second small diamond search further comprises performing said first small diamond and said second small diamond search using said electronic device; and
comparing each of the third and fourth blocks to the reference block to determine a block that more closely matches the reference block.

10. The method of claim 9 further comprising:
using information from the more closely-matched block, performing a fine search to select a fifth block in the search frame that is a better match to the reference block than the more closely-matched block to the reference block.

11. The method of claim 10, wherein the first and second large diamond searches and the first and second small diamond searches are based on a 5SDS.

12. The method of claim 10, wherein the fine search comprises an 8×8 block search and a half-pixel search, wherein the half-pixel search is carried out based on information generated by the 8×8 block search.

13. The method of claim 9, wherein the first predicted start position is based on a block immediately adjacent to and on a first side of the reference block, and the second predicted start position is based on a block immediately adjacent to and to a second side of the reference block.

14. The method of claim 9, wherein said first and second diamond searches comprise performing respective Sum of Absolute Difference (SAD) calculations for a plurality of blocks of said search frame to determine how well each of said plurality of blocks matches said reference block.

15. A video motion estimator coupled to memory and a processor, said video motion estimator comprising:
a search module coupled to said memory and operable to perform a plurality of searches to identify blocks in a search frame that closely match a reference block in a reference frame based on a selection criteria, wherein a condition for performing a subsequent coarse search of said plurality of searches is associated with a distance between a first motion vector and a second motion vector, and wherein said search module is further operable to perform at least two of said plurality of searches concurrently;
a compare and motion vector module coupled to the search module, the compare and motion vector module for monitoring and storing values for said selection criteria, the compare and motion vector module further for monitoring and determining motion vectors used by the search module for performing said plurality of searches; and a scheduler coupled to the search module and for controlling said plurality of searches performed by the search module based on a predetermined motion estimation process.

16. The video motion estimator of claim 15, wherein the predetermined motion estimation process comprises:
    selecting a first predict start point in a search frame and a second predict start point in the search frame;
    using the first predict start point, performing a first coarse search to select a first block in the search frame that closely matches said reference block; and
    using information associated with the first block and the second predict start point, performing a second coarse search to select a second block in the search frame that is a better match to the reference block than the first block to the reference block.

17. The video motion estimator of claim 16 further comprising an additional search module coupled to the memory, the compare and motion vector module, and the scheduler, wherein the predetermined motion estimation process further comprises performing a fine search to select a third block in the search frame that is a better match to the reference block than the second block to the reference block, wherein the fine search comprises an 8×8 block search performed by the additional search module using the selection criteria and information associated with the second block.

18. The video motion estimator of claim 17, wherein the predetermined motion estimation process further comprises determining whether a second coarse search is needed before performing the second coarse search, wherein if the second coarse search is not needed, skipping the second coarse search and performing the fine search.

19. The video motion estimator of claim 16, wherein the first coarse search comprises a large diamond search and a small diamond search, and wherein the small diamond search is performed based on information generated by the large diamond search.

20. The video motion estimator of claim 19, wherein the large diamond search and the small diamond search are based on a 5SDS search.

21. The video motion estimator of claim 17, wherein the fine search further comprises a half-pixel search performed by the search module based on information generated by the 8×8 block search performed by the additional search module.

22. The video motion estimator of claim 16, wherein the first predicted start position is based on a block adjacent to and on a first side of the reference block, and the second predicted start position is based on a block adjacent to and on a second side of the reference block.

23. The video motion estimator of claim 15, wherein said plurality of searches comprises performing respective Sum of Absolute Difference (SAD) calculations for a plurality of blocks of said search frame to determine how well each of said plurality of blocks matches said reference block.

24. The video motion estimator of claim 15 further comprising:
    a standard deviation calculator coupled to memory and the scheduler, the standard deviation calculator computing the Mean And Standard Deviation (MAD) value of a block when receiving a signal from the scheduler that the motion estimation process is completed; and
    an intra/inter decision module coupled to the scheduler and the standard deviation calculator, the intra/inter decision module determines whether an I-frame or a P-frame is involved by comparing the MAD value against an updated value of said selection criteria.

25. The video motion estimator of claim 15, wherein the predetermined motion estimation process comprises:
    selecting a first predict start point in a search frame and a second predict start point in the search frame;
    using the first predict start point and the second predict start point in the search frame, concurrently performing a first large diamond search and a second large diamond search to select a first block in the search frame and a second block in the search frame that closely match said reference block;
    using information associated with the first and second blocks, performing a first small diamond search and a second small diamond search to select a third block in the search frame and a fourth block in the search frame that are better matches to the reference block than said first and second blocks to the reference block, wherein the first small diamond search is based on information from the first large diamond search and the second small diamond search is based on information from the second large diamond search; and
    comparing each of the third and fourth blocks to the reference block to determine a selected block that more closely matches the reference block.

26. The video motion estimator of claim 25 further comprising an additional search module coupled to the memory, the compare and motion vector module, and the scheduler, wherein the predetermined motion estimation process further comprises performing a fine search to select a fifth block in the search frame that is a better match to the reference block than the selected block to the reference block, wherein the fine search comprises an 8×8 block search performed by the additional search module using the selection criteria and information associated with the selected block.

27. The video motion estimator of claim 25, wherein the large diamond searches and the small diamond searches are based on 5SDS.

28. The video motion estimator of claim 26, wherein the fine search further comprises a half-pixel search performed by the search module based on information generated by the 8×8 block search performed by the additional search module.

29. The video motion estimator of claim 25, wherein the first predicted start position is based on a block adjacent to and on a first side of the reference block, and the second predicted start position is based on a block adjacent to and on a second side of the reference block.

* * * * *